United States Patent
Nakajima et al.

(10) Patent No.: US 8,456,188 B2
(45) Date of Patent: Jun. 4, 2013

(54) ELECTRONIC APPARATUS AND CABLE DEVICE

(75) Inventors: Yasuhisa Nakajima, Kanagawa (JP); Hidekazu Kikuchi, Kanagawa (JP); Takehiko Saitou, Tokyo (JP); Shigehiro Kawai, Tokyo (JP); Masaki Kitano, Tokyo (JP)

(73) Assignee: Sony Corporation (JP)

( * ) Notice: Subject to any disclaimer, the term of this patent is extended or adjusted under 35 U.S.C. 154(b) by 189 days.

(21) Appl. No.: 12/312,352
(22) PCT Filed: Nov. 7, 2007
(86) PCT No.: PCT/JP2007/071665
§ 371 (c)(1),
(2), (4) Date: Jun. 16, 2010
(87) PCT Pub. No.: WO2008/056719
PCT Pub. Date: May 15, 2008

(65) Prior Publication Data
US 2010/0289530 A1    Nov. 18, 2010

(30) Foreign Application Priority Data

Nov. 7, 2006   (JP) ............................... P2006-301486
Feb. 28, 2007   (JP) ............................... P2007-050426

(51) Int. Cl.
*H03K 19/175*   (2006.01)
*G06F 13/38*   (2006.01)

(52) U.S. Cl.
USPC ................ 326/30; 326/86; 710/305; 710/306

(58) Field of Classification Search
USPC ..... 710/100, 305, 306; 439/77, 502; 375/257, 375/295; 326/30, 86
See application file for complete search history.

(56) References Cited

U.S. PATENT DOCUMENTS 6,320,406 B1 * 11/2001 Morgan et al. ................. 326/14
6,353,865 B1   3/2002 Kiryu et al.

(Continued)

FOREIGN PATENT DOCUMENTS

JP   62-75653 U   5/1987
JP   02-206249 A   8/1990

(Continued)

OTHER PUBLICATIONS

Supplementary European Search Report EP07831396, dated Nov. 18, 2010.

(Continued)

*Primary Examiner* — Vibol Tan
(74) *Attorney, Agent, or Firm* — Lerner, David, Littenberg, Krumholz & Mentlik, LLP

(57) ABSTRACT

To discriminate whether a cable in conformity with a conventional standard or a cable in conformity with a new standard is connected.

An HPD signal line (902) has, on an expanded HDMI sink apparatus (402) side circuit, a pull-up resistor (911) between the HPD signal line (902) and a voltage supply and a pull-down resistor (913) between the HPD signal line (902) and the ground, and a reserved line (903) has, on the expanded HDMI sink apparatus (402) side circuit, a pull-down resistor (914) between the reserved line (903) and a ground, and within a new HDMI cable (901), a pull-up resistor (912) between the reserved line (903) and a voltage supply of an expanded HDMI source apparatus (401). The expanded HDMI sink apparatus compares a voltage at a test point (19) on the reserved line (903) on the expanded HDMI sink apparatus (402) side with a reference voltage by using a voltage comparator (916). A CPU of the expanded HDMI sink apparatus (402) determines, when an output from the voltage comparator (916) is High, a normal state where the new HDMI cable (901) is inserted, and when an output from the voltage comparator (916) is Low, determines a state where a conventional HDMI cable (931) is erroneously inserted.

6 Claims, 23 Drawing Sheets

U.S. PATENT DOCUMENTS

| | | | |
|---|---|---|---|
| 6,378,025 | B1 | 4/2002 | Getty |
| 6,618,774 | B1 * | 9/2003 | Dickens et al. ............... 710/64 |
| 7,259,589 | B1 * | 8/2007 | Hui et al. ..................... 326/63 |
| 7,540,746 | B2 * | 6/2009 | Barnette et al. ............. 439/77 |
| 7,729,874 | B2 * | 6/2010 | Keady et al. ................. 702/89 |
| 2002/0169915 | A1 | 11/2002 | Wu |
| 2004/0027515 | A1 | 2/2004 | Itakura |
| 2005/0182876 | A1 | 8/2005 | Kim et al. |
| 2006/0095401 | A1 | 5/2006 | Krikorian et al. |

FOREIGN PATENT DOCUMENTS

| | | | |
|---|---|---|---|
| JP | 04-245817 | A | 9/1992 |
| JP | 2001057567 | A | 2/2001 |
| JP | 2001-320479 | A | 11/2001 |
| JP | 2002-204272 | A | 7/2002 |
| JP | 2004254027 | A | 9/2004 |
| JP | 2004294437 | A | 10/2004 |
| JP | 2004356752 | A | 12/2004 |
| JP | 2005-057714 | A | 3/2005 |
| JP | 2005135433 | A | 5/2005 |
| JP | 2005143033 | A | 6/2005 |
| JP | 2006-019948 | A | 1/2006 |
| JP | 2006-107292 | A | 4/2006 |
| JP | 2006-140776 | A | 6/2006 |
| JP | 2006191161 | A | 7/2006 |
| JP | 2006203800 | A | 8/2006 |
| JP | 2006245949 | A | 9/2006 |
| JP | 2006-295822 | A | 10/2006 |
| WO | 2005-064982 | A1 | 7/2005 |
| WO | 2006-057324 | A1 | 6/2006 |

OTHER PUBLICATIONS

"Datasheet UCC5630A Multimode SCSI 9 Line Terminator" Texas Instruments, [On line] Mar. 31, 2002, p. 12pp, XP 002605576.

Office Action from Japanese Application No. 2008-543106, dated Apr. 17, 2012.

IEEE Standard for Information Technology Telecommunications, Supplement to Carrier Sense Multiple Access with Collision Detection (CSMA/CD)Access Method and Physical Layer Specifications. Physical Layer Parameters and Specifications for 1000 Mb/s Operation Over 4—Pair of Category 5. Balanced Copper Cabling, Type 1000 BASE-T, Jun. 26, 1999.

Communication pursuant to Article 94 (3) EPC, from European Application No. 07831380.6-2202, dated Jun. 18, 2012.

Communication pursuant to Article 94 (3) EPC, from European Application No. 07831382.2-2202, dated Jun. 21, 2012.

"High-Definition Multimedia Interface Specification Version 1.3". Internet Citation, Jun. 22, 2006, XP002391813, Retrieved from the Internet: URL:http://www.hdmi.org/download/HDMI_Spec_1.3_GM1.pdf [retrieved on Jul. 24, 2006].

Office Action from Japanese Application No. 2008-543113, dated Jul. 10, 2012.

Office Action from Japanese Application No. 2008-543096, dated Nov. 22, 2012.

Office Action from Japanese Application No. 2008-543112, dated Nov. 27, 2012.

Office Action from Japanese Application No. 2008-543113, dated Jan. 8, 2013.

* cited by examiner

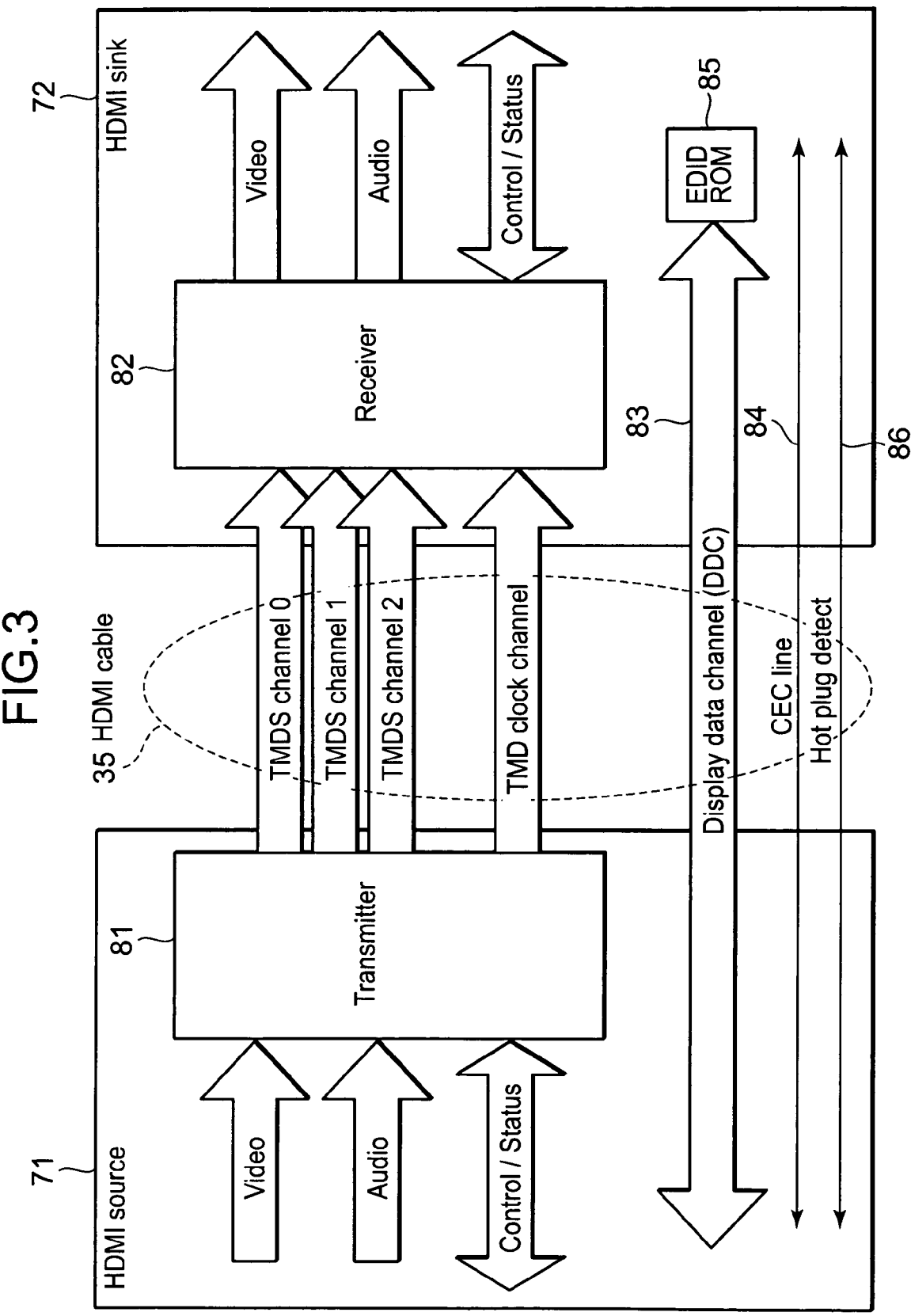

FIG.4

| PIN | Signal assignment | PIN | Signal assignment |
|---|---|---|---|
| 1 | TMDS data2+ | 2 | TMDS data2 shield |
| 3 | TMDS data2− | 4 | TMDS data1+ |
| 5 | TMDS data1 shield | 6 | TMDS data1− |
| 7 | TMDS data0+ | 8 | TMDS data0 shield |
| 9 | TMDS data0− | 10 | TMDS clock+ |
| 11 | TMDS clock shield | 12 | TMDS clock− |
| 13 | CEC | 14 | Reserved (N.C. on device) |
| 15 | SCL | 16 | SDA |
| 17 | DDC/CEC ground | 18 | +5V power |
| 19 | Hot plug detect | | |

HDMI PINS (TYPE-A)

FIG.5

| PIN | Signal assignment | PIN | Signal assignment |
|---|---|---|---|
| 1 | TMDS data2 shield | 2 | TMDS data2+ |
| 3 | TMDS data2− | 4 | TMDS data1 shield |
| 5 | TMDS data1+ | 6 | TMDS data1− |
| 7 | TMDS data0 shield | 8 | TMDS data0+ |
| 9 | TMDS data0− | 10 | TMDS Clock shield |
| 11 | TMDS clock+ | 12 | TMDS clock− |
| 13 | DDC/CEC ground | 14 | CEC |
| 15 | SCL | 16 | SDA |
| 17 | Reserved | 18 | +5V power |
| 19 | Hot plug detect | | |

HDMI PINS (TYPE-C)

E-EDID data structure

FIG.9

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE registration identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | Reserved (0) | DVI-dual |
| 7 | Max_TMDS_clock | | | | | | | |
| 8 | Latency | Full duplex | Half duplex | Video latency | | | | |
| 9 | Audio latency | | | | | | | |
| 10 | | | | | | | | |
| 11 | Interlaced video latency | | | | | | | |
| 12 | Interlaced audio latency | | | | | | | |
| 13...N | Reserved (0) | | | | | | | |

E-EDID vendor specific data block structure

FIG.14

ELECTRONIC APPARATUS AND CABLE DEVICE

CROSS-REFERENCES TO RELATED APPLICATIONS

The present application is a national phase entry under 35 U.S.C. §371 of International Application No. PCT/JP2007/071665 filed Nov. 7, 2007, published on May 15, 2008 as WO 2008/056719 A1, which claims priority from Japanese Patent Application No. JP 2006-301486 filed in the Japanese Patent Office on Nov. 7, 2006 and Japanese Patent Application No. JP 2007-050426 filed in the Japanese Patent Office on Feb. 28, 2007.

TECHNICAL FIELD

The present invention relates to an electronic apparatus having a communication interface such as HDMI (High-Definition Multimedia Interface) and a cable device connected to the electronic apparatus.

BACKGROUND ART

In recent years, HDMI® is prevailing as a communication interface for transmitting at high speed a digital television signal, i.e., pixel data of uncompressed (baseband) images, and audio data attached to the images, for example, from a DVD (Digital Versatile Disc) recorder, a set-top box, and other AV (Audio Visual) sources to a television set, a projector, and other displays. Examples of patent publications regarding the HDMI include the following.

Patent Document 1: Japanese Patent Application Laid-open No. 2005-57714

Patent Document 2: Japanese Patent Application Laid-open No. 2006-19948

DISCLOSURE OF THE INVENTION

Problem to be solved by the Invention

Incidentally, the HDMI standard is expected to be further expanded in the future. In this expansion, it is expected that various improvements will be made while retaining compatibility with a conventional HDMI standard. When such expansion is made, if a user erroneously inserts a conventional HDMI cable between a source apparatus and a sink apparatus which are in conformity with the expanded HDMI standard, it is difficult to detect it, which results in lack of convenience for the user who has erroneously inserted the conventional HDMI cable.

In view of the above-mentioned circumstances, it is an object of the present invention to provide an electronic apparatus capable of discriminating whether a cable in conformity with a conventional standard or a cable in conformity with a new standard is connected, and a cable device corresponding to the discrimination.

Means for Solving the Problem

To solve the problem mentioned above, according to a principle aspect of the present invention, there is provided an electronic apparatus, including a connector capable of connecting with a first cable that incorporates a differential signal line constituted of a first signal line and a second signal line, and a resistor provided on at least the second signal line, and with a second cable that incorporates the first signal line and the second signal line as separate signal lines, respectively, a comparison means to compare a voltage at the second signal line detected via the connector with a predetermined reference voltage, and a discrimination means for discriminating whether the first cable or the second cable is connected to the connector based on a result of the comparison.

Herein, the first cable and the second cable are communication cables complying with an HDMI standard, for example. Further, for example, the first signal line is an HPD line in HDMI, and the second signal line is a reserved line in HDMI. In the first cable, the first signal line and the second signal line are, for example, wired as a twist pair such that a communication through differential signals can be performed.

With this structure, even when a cable unintended by a user is connected, it is possible to easily prompt a replacement to an intended cable, because it is possible to discriminate whether the first cable or the second cable is connected.

The electronic apparatus may further include a capacitor provided on each of the first signal line and the second signal line.

Accordingly, the comparison of the voltages can be performed accurately because a direct current on the first signal line and the second signal line is cut.

In the electronic apparatus, the resistor may be a first pull-up resistor provided on the second signal line, and the comparison means may include a second pull-up resistor and a first pull-down resistor that are provided on the first signal line, a second pull-down resistor provided on the second signal line, and a comparator to compare the voltage at the second signal line with the reference voltage.

Accordingly, a difference between voltages at the second signal line, which are detected when the first cable is connected to the connector and when the second cable is connected to the connector, respectively, can be made larger. Therefore, it is possible to perform discrimination accurately.

In the electronic apparatus, the resistor may be constituted of a first pull-down resistor provided on the first signal line and a second pull-down resistor provided on the second signal line, and the comparison means may include a first pull-up resistor provided on the first signal line, a second pull-up resistor provided on the second signal line, and a comparator to compare the voltage at the second signal line with the reference voltage.

Further, in the electronic apparatus, the resistor may be provided between the first signal line and the second signal line, and the comparison means may include a first pull-up resistor and a first pull-down resistor that are provided on the first signal line, a second pull-up resistor and a second pull-down resistor that are provided on the second signal line, an open-collector type transistor provided on the first signal line, and a comparator to compare the voltage at the second signal line with the reference voltage.

With these structures, it is possible to design a symmetrical differential circuit when the first cable is connected to the connector, so that high frequency signals can be transmitted using the differential signal line without phase distortion.

The electronic apparatus may further include an output means for outputting a result of the discrimination.

Herein, the output means is, e.g., a display means or an audio output means. Accordingly, it is possible to easily notify a user's erroneous insertion of a cable.

According to another aspect of the present invention, there is provided a cable device, including a cable body that incorporates a differential signal line constituted of a first signal line and a second signal line, and a resistor connected to at least the second signal line, and connectors provided on both ends of the cable body, to connect a first electronic apparatus and a second electronic apparatus.

Herein, the resistor may be provided on at least one of the first signal line and the second signal line, or provided so as to connect the first signal line and the second signal line.

EFFECT OF THE INVENTION

As described above, with the present invention, it is possible to discriminate whether a cable in conformity with a conventional standard or a cable in conformity with a new standard is connected.

BEST MODES FOR CARRYING OUT THE INVENTION

Hereinafter, embodiments of the present invention will be described with reference to the drawings.

First, a description will be given on a communication system (image transmission system) that can perform bidirectional IP communication at high speed, while retaining compatibility with a communication interface such as conventional HDMI.

In recent years, HDMI® is prevailing as a communication interface for transmitting at high speed a digital television signal, i.e., pixel data of uncompressed (baseband) images, and audio data accompanied by the images, for example, from a DVD recorder, a set-top box, and other AV sources to a television set, a projector, and other displays.

For HDMI®, the HDMI specifications stipulate a TMDS (Transition Minimized Differential Signaling) channel unidirectionally transmitting at high speed pixel data and audio data from an HDMI® source to an HDMI® sink, a CEC line (Consumer Electronics Control Line) for performing bidirectional communication between an HDMI® source and an HDMI® sink, and the like.

FIG. 1 is a diagram showing a structure of a typical image transmission system.

For example, as shown in FIG. 1, pixel data and audio data can be transmitted at high speed by connecting a digital television set 11 and an AV amplifier 12 by an HDMI® cable 13 conforming with HDMI®.

The digital television set 11, the AV amplifier 12, and a reproducing apparatus 14 are installed in a living room of a user's house at the left side in FIG. 1. The digital television set 11 and the AV amplifier 12, and the AV amplifier 12 and reproducing apparatus 14 are connected by an HDMI® cable 13 and an HDMI® cable 15.

Further, a hub 16 is installed in the living room, and the digital television set 11 and reproducing apparatus 14 are connected to the hub 16 by a LAN (Local Area Network) cable 17 and a LAN cable 1. In addition, in a bedroom to the right of the living room in the figure, a digital television set 19 is installed, and the digital television set 19 is connected to the hub 16 via a LAN cable 20.

For example, in reproducing content recorded in the reproducing apparatus 14 and displaying an image on the digital television set 11, the reproducing apparatus 14 decodes pixel data and audio data for reproducing the content, and supplies the obtained uncompressed pixel data and audio data to the digital television set 11 via the HDMI® cable 15, the AV amplifier 12, and the HDMI® cable 13. Based on the pixel data and audio data supplied from the reproducing apparatus 14, the digital television set 11 displays images and outputs sounds.

Further, in reproducing content recorded in the reproducing apparatus 14 and displaying images on the digital television set 11 and the digital television set 19 at the same time, the reproducing apparatus 14 supplies compressed pixel data and audio data for reproducing the content to the digital television set 11 via the LAN cable 18, the hub 16, and the LAN cable 17, and to the digital television set 19 via the LAN cable 18, the hub 16, and the LAN cable 20.

Further, the digital television set 11 and the digital television set 19 decode the pixel data and audio data supplied from the reproducing apparatus 14, and display images and output sounds based on the obtained uncompressed pixel data and audio data.

Further, in a case where the digital television set 11 receives pixel data and audio data for reproducing a program over television broadcasting, when the received audio data is audio data of, for example, 5.1-channel surround audio data and the digital television set 11 cannot decode the received audio data, the digital television set 11 converts the audio data into an optical signal and transmits the optical signal to the AV amplifier 12.

The AV amplifier 12 receives the optical signal transmitted from the digital television set 11, photoelectrically converts the optical signal, and decodes the audio data thus obtained. In addition, the AV amplifier 12 amplifies the decoded uncompressed audio data when necessary, and reproduces sounds at surround speakers connected to the AV amplifier 12. In this manner, the digital television set 11 reproduces a 5.1-channel surround program by decoding the received pixel data and displaying images by using the decoded pixel data and by outputting sounds at the AV amplifier 12 based on the audio data supplied to the AV amplifier 12.

FIG. 2 is a diagram showing a structure of an image transmission system according to an embodiment to which the present invention is applied.

The image transmission system is constituted of a digital television set 31, an amplifier 32, a reproducing apparatus 33, and a digital television set 34. The digital television set 31 and amplifier 32, and the amplifier 32 and reproducing apparatus 33 are connected by an HDMI® cable 35 and an HDMI® cable 36 in conformity with HDMI®, respectively. The digital television set 31 and the digital television set 34 are connected by a LAN cable 37 for LAN such as Ethernet (Registered Trademark).

In the example shown in FIG. 2, the digital television set 31, the amplifier 32, and the reproducing apparatus 33 are installed in a living room of a user's house at the left in FIG. 2, and the digital television set 34 is installed in a bedroom to the right of the living room.

The reproducing apparatus 33 is formed of, for example, a DVD player, a hard disc recorder, or the like, decodes pixel data and audio data for reproducing content, and supplies the uncompressed pixel data and audio data thus obtained to the amplifier 32 via the HDMI® cable 36.

The amplifier 32 is formed of, for example, an AV amplifier, is supplied with pixel data and audio data from the reproducing apparatus 33, and amplifies the supplied audio data when necessary. Further, the amplifier 32 supplies the audio data amplified when necessary and the pixel data, which are supplied from the reproducing apparatus 33, to the digital television set 31 via the HDMI® cable 35. Based on the pixel data and audio data supplied from the amplifier 32, the digital television set 31 displays images and outputs sounds to reproduce the content.

In addition, the digital television set 31 and the amplifier 32 can perform bidirectional communication such as IP communication at high speed by using the HDMI® cable 35, and the amplifier 32 and the reproducing apparatus 33 can also perform bidirectional communication such as IP communication at high speed by using the HDMI® cable 36.

Namely, for example, the reproducing apparatus 33 can transmit compressed pixel data and audio data as data in conformity with IP to the amplifier 32 via the HDMI® cable 36 through IP communication with the amplifier 32, and the amplifier 32 can receive the compressed pixel data and audio data transmitted from the reproducing apparatus 33.

In addition, the amplifier 32 can transmit compressed pixel data and audio data as data in conformity with IP to the digital television set 31 via the HDMI® cable 35 through IP communication with the digital television set 31, and the digital television set 31 can receive the compressed pixel data and audio data transmitted from the amplifier 32.

The digital television set 31 can therefore transmit the received pixel data and audio data to the digital television set 34 via the LAN cable 37. Further, the digital television set 31 decodes the received pixel data and audio data, and based on the obtained uncompressed pixel data and audio data, displays images and outputs sounds to reproduce the content.

The digital television set 34 receives and decodes the pixel data and audio data transmitted from the digital television set 31 via the LAN cable 37, and based on the uncompressed pixel data and audio data obtained by decoding, displays images and outputs sounds to reproduce the content. In this manner, the same or different content can be reproduced at the same time at the digital television set 31 and the digital television set 34.

Further, when the digital television set 31 receives pixel data and audio data for reproducing a program as content over television broadcasting, and if the received audio data is audio data of, for example, 5.1-channel surround audio data and the digital television set 31 cannot decode the received audio data, the digital television set 31 transmits the received audio data to the amplifier 32 via the HDMI® cable 35 by IP communication with the amplifier 32.

The amplifier 32 receives and decodes the audio data transmitted from the digital television set 31, and amplifies the decoded audio data when necessary. Then, the amplifier 32 reproduces 5.1-channel surround sounds from speakers (not shown) connected to the amplifier 32.

The digital television set 31 transmits the audio data to the amplifier 32 via the HDMI® cable 35, decodes the received pixel data, and based on the pixel data obtained by decoding, displays images to reproduce the program.

In this manner, in the image transmission system shown in FIG. 2, the electronic apparatus such as the digital television set 31, amplifier 32, and reproducing apparatus 33 connected by the HDMI® cable 35 and the HDMI® cable 36 can perform IP communication at high speed by using the HDMI® cables, and therefore it is not necessary to use LAN cable corresponding to the LAN cable 17 shown in FIG. 1.

Further, the digital television set 31 and the digital television set 34 are connected by the LAN cable 37, and the digital television set 31 can transmit data received from the reproducing apparatus 33 via the HDMI® cable 36, the amplifier 32, and the HDMI® cable 35, to the digital television set 34 via the LAN cable 37. It is therefore unnecessary to use the LAN cable and the electronic apparatus corresponding to the LAN cable 18 and the hub 16 shown in FIG. 1.

In the conventional image transmission system shown in FIG. 1, cables of different types are required depending on transmission/reception data and communication methods so that wirings of cables interconnecting electronic apparatuses are complicated. In contrast, in the image transmission system shown in FIG. 2, electronic apparatuses connected by the HDMI® cable can perform high speed bidirectional communication such as IP communication so that connection between electronic apparatuses can be simplified. Namely, complicated conventional wirings of cables connecting electronic apparatuses can be made simpler.

Next, FIG. 3 shows an example of a structure of an HDMI® source and an HDMI® sink which are respectively built in electronic apparatuses connected by an HDMI® cable, e.g., an HDMI® source provided in the amplifier 32 shown in FIG. 2 and an HDMI® sink provided in the digital television set 31.

An HDMI® source 71 and an HDMI® sink 72 are connected by one HDMI® cable 35, and the HDMI® source 71 and the HDMI® sink 72 can perform bidirectional IP communication at high speed by using the HDMI® cable 35 while retaining compatibility with current HDMI®.

In an effective video period (hereinafter, arbitrarily referred to also as an active video period) which is a period from one vertical synchronization signal to the next vertical synchronization signal subtracting horizontal blanking periods and a vertical blanking period, the HDMI® source 71 transmits differential signals corresponding to pixel data of an uncompressed image of one screen, unidirectionally to the HDMI® sink 72 via a plurality of channels. In the horizontal blanking period or vertical blanking period, the HDMI® source transmits differential signals corresponding to at least audio data and control data accompanied by the image, other auxiliary data and the like, unidirectionally to the HDMI® sink 72 via a plurality of channels.

That is, the HDMI® source 71 has a transmitter 81. The transmitter 81 converts, for example, pixel data of an uncompressed image into corresponding differential signals, and transmits unidirectionally and serially the differential signals to the HDMI® sink 72 via three TMDS channels #0, #1, and #2 of the HDMI® cable 35.

Further, the transmitter 81 converts audio data accompanied by uncompressed images, necessary control data, other auxiliary data and the like, into corresponding differential signals, and transmits unidirectionally and serially the converted differential signals to the HDMI® sink 72 connected via the HDMI® cable 35 by using three TMDS channels #0, #1, and #2.

Further, the transmitter 81 transmits a pixel clock synchronizing with the pixel data to be transmitted via the three TMDS channels #0, #1, and #2, to the HDMI® sink 72 connected to the HDMI® cable 35, via a TMDS clock channel. Pixel data of 10 bits is transmitted via one TMDS channel #i (i=0, 1, and 2) during one pixel clock.

The HDMI® sink 72 receives the differential signals corresponding to the pixel data unidirectionally transmitted from the HDMI® source 71 via the plurality of channels during the active video period, and receives the differential signals corresponding to the audio data and control data unidirectionally transmitted from the HDMI® source 71 via the plurality of channels during the horizontal blanking period or vertical blanking period.

That is, the HDMI® sink 72 has a receiver 82. The receiver 82 receives the differential signals corresponding to the pixel data and the differential signals corresponding to the audio data and control data unidirectionally transmitted from the HDMI® source 71 connected to the HDMI® cable 35 via the TMDS channels #0, #1, and #2, synchronously with the pixel clock transmitted also from the HDMI® source 71 via the TMDS clock channel.

The transmission channels of the HDMI® system constituted of the HDMI® source 71 and HDMI® sink 72 include a DDC (Display Data Channel) 83 and a transmission channel called a CEC line 84, in addition to the three TMDS channels #0 to #2 as transmission channels for unidirectionally and serially transmitting the pixel data and audio data from the HDMI® source 71 to the HDMI® sink 72 synchronously with the pixel clock and the TMDS clock channel as a transmission channel for transmitting the pixel clock.

The DDC 83 is constituted of two signal lines (not shown) contained in the HDMI® cable 35, and is used for the HDMI® source 71 to read E-EDID (Enhanced Extended Display Identification Data) from the HDMI® sink 72 connected to the HDMI® source 71 via the HDMI® cable 35.

That is, in addition to the receiver 82, the HDMI® sink 72 has an EDIDROM (EDID ROM (Read Only Memory)) 85 storing E-EDID representative of information on the settings and performance of the HDMI® sink 72 itself. The HDMI® source 71 reads via DDC 83 E-EDID stored in EDIDROM 85 of the HDMI® sink 72, from the HDMI® sink 72 connected to the HDMI® source 71 via the HDMI® cable 35, and based on E-EDID, recognizes the settings and performance of the HDMI® sink 72, i.e., for example, an image format (profile) capable of being processed by the HDMI® sink 72 (an electronic apparatus possessing the HDMI® sink 72) such as RGB (Red, Green, Blue), YCbCr 4:4:4 and YCbCr 4:2:2.

Although not shown, similar to the HDMI® sink 72, the HDMI® source 71 can also store E-EDID and transmit E-EDID to the HDMI® sink 72 when necessary.

The CEC line 84 is constituted of one signal line (not shown) contained in the HDMI® cable 35, and is used for bidirectional communication of the control data between the HDMI® source 71 and the HDMI® sink 72.

Further, the HDMI® source 71 and the HDMI® sink 72 can perform bidirectional IP communication by transmitting a frame in conformity with IEEE (Institute of Electrical and Electronics Engineers) 802.3 to the HDMI® sink 72 and the HDMI® source 71, respectively, via DDC 83 or CEC line 84.

The HDMI® cable 35 contains also a signal line 86 connected to a pin called Hot Plug Detect. Using this signal line 86, the HDMI® source 71 and the HDMI® sink 72 can detect a connection of a new electronic apparatus, i.e., the HDMI® sink 72 or the HDMI® source 71, respectively.

Next, FIG. 4 and FIG. 5 show the pin assignment of a connector (not shown) mounted on the HDMI® source 71 or the HDMI® sink 72 to be connected to the HDMI® cable 35.

It should be noted that in FIG. 4 and FIG. 5, a pin number for identifying each pin of the connector is written in the left column (PIN column), and a name of a signal assigned to each pin identified by the pin number written in the left column at the same row is written in the right column (Signal Assignment column).

FIG. 4 shows the assignment of pins of a connector called Type-A of HDMI®.

Two signal lines which are differential signal lines for transmitting differential signals TMDS Data#i+ and TMDS Data#i− of a TMDS channel #i are connected to pins (pin numbers 1, 4, and 7) assigned to TMDS Data#i+ and pins (pin numbers 3, 6, and 9) assigned to TMDS Data#i−.

Further, the CEC line 84 for transmitting a CEC signal of control data is connected to a pin having a pin number of 13, and a pin having a pin number 14 is a reserved pin. If bidirectional IP communication can be performed by using this reserved pin, compatibility with current HDMI® can be retained. In order for differential signals to be transmitted by using the CEC line 84 and a signal line to be connected to the pin having the pin number 14, the signal line to be connected to the pin having the pin number 14 and the CEC line 84 are wired as a differential twist pair and shielded and grounded to a ground line of the CEC line 84 and DDC 83 to be connected to a pin having a pin number 17.

Further, a signal line for transmitting an SDA (Serial Data) signal such as E-EDID is connected to a pin having a pin number 16, and a signal line for transmitting an SCL (Serial Clock) signal as a clock signal to be used for transmission/reception synchronization of the SDA signal is connected to a pin having a pin number 15. DDC 83 shown in FIG. 3 is constituted of the signal line for transmitting the SDA signal and the signal line for transmitting the SCL signal.

In addition, similarly to the CEC line 84 and the signal line to be connected to the pin having the pin number 14, the signal line for transmitting the SDA signal and the signal line for transmitting the SCL signal are wired as a differential twist pair and shielded and grounded to a ground line to be connected to the pin having the pin number 17, in order for differential signals to be transmitted.

Further, the signal line 86 for transmitting a signal for detecting connection of a new electronic apparatus is connected to a pin having a pin number 19.

FIG. 5 shows the assignment of pins of a connector called Type-C or mini-type of HDMI®.

Two signal lines which are differential signal lines for transmitting differential signals TMDS Data#i+ and TMDS Data#i− of a TMDS channel #i are connected to pins (pin numbers 2, 5, and 8) assigned to TMDS Data#i+ and pins (pin numbers 3, 6, and 9) assigned to TMDS Data#i−.

Further, the CEC line 84 for transmitting a CEC signal is connected to a pin having a pin number of 14, and a pin having a pin number 17 is a reserved pin. Similarly to Type-A, the signal line to be connected to the pin having the pin number 17 and the CEC line 84 are wired as a differential twist pair and shielded and grounded to the ground line of the CEC line 84 and DDC 83 to be connected to a pin having a pin number 13.

In addition, a signal line for transmitting an SDA signal is connected to a pin having a pin number 16, and a signal line for transmitting an SCL signal is connected to a pin having a pin number 15. Similarly to Type-A, the signal line for transmitting the SDA signal and the signal line for transmitting the SCL signal are wired as a differential twist pair and shielded and grounded to a ground line to be connected to the pin having the pin number 13, in order for differential signals to be transmitted. The signal line 86 for transmitting a signal for detecting connection of a new electronic apparatus is connected to a pin having a pin number 19.

Next, FIG. 6 is a diagram showing the structure of the HDMI® source 71 and the HDMI® sink 72 for performing IP communication by half duplex communication using the CEC line 84 and the signal line connected to the reserved pin of the HDMI® connector. Note that FIG. 6 shows an example of the structure of a part regarding half duplex communication of the HDMI® source 71 and HDMI® sink 72. In FIG. 6, parts corresponding to those shown in FIG. 3 are represented by identical symbols, and the description thereof is omitted as appropriate.

The HDMI® source 71 is constituted of the transmitter 81, a switching control unit 121, and a timing control unit 122. In addition, the transmitter 81 is provided with a converting unit 131, a decoding unit 132, and a switch 133.

Supplied to the converting unit 131 is Tx data to be transmitted from the HDMI® source 71 to the HDMI® sink 72 by bidirectional IP communication between the HDMI® source 71 and HDMI® sink 72. For example, Tx data is compressed pixel data and audio data and the like.

The converting unit 131 is constituted of, e.g., a differential amplifier, and converts the supplied Tx data into differential signals having two partial signals. Further, the converting unit 131 transmits the differential signals obtained by conversion to the receiver 82 via the CEC line 84 and a signal line 141 connected to a reserved pin of a connector (not shown) provided in the transceiver 81. Namely, the converting unit 131 supplies one partial signal constituting the differential signals obtained by conversion to the switch 133 via the CEC line 84, more specifically, via the signal line that is provided in the transmitter 81 and connected to the CEC line 84 of the HDMI® cable 35, and also supplies the other partial signal constituting the differential signals to the receiver 82 via the signal line 141, more specifically, via the signal line that is provided in the transmitter 81 and connected to the signal line 141 of the HDMI® cable 35 and via the signal line 141.

The decoding unit 132 is constituted of, e.g., a differential amplifier whose input terminals are connected to the CEC line 84 and signal line 141. Under control of the timing control unit 122, the decoding unit 132 receives differential signals transmitted from the receiver 82 via the CEC line 84 and signal line 141, i.e., the differential signals constituted of the partial signal on the CEC line 84 and the partial signal on the signal line 141, and decodes the differential signals to output original Rx data. Here, Rx data refers to data transmitted from the HDMI® sink 72 to the HDMI® source 71 by bidirectional IP communication between the HDMI® source 71 and the HDMI® sink 72, and includes a command for requesting transmission of pixel data and audio data or the like.

At a timing when data is transmitted, the switch 133 is supplied with the CEC signal from the HDMI® source 71 or the partial signal constituting the differential signals corresponding to Tx data from the converting unit 131, and at a timing when data is received, the switch 133 is supplied with the CEC signal from the receiver 82 or the partial signal constituting the differential signals corresponding to Rx data from the receiver 82. Under control of the switching control unit 121, the switch 133 selectively outputs the CEC signal from the HDMI® source 71, the CEC signal from the receiver 82, the partial signal constituting the differential signals corresponding to Tx data, or the partial signal constituting the differential signals corresponding to Rx data.

Namely, the switch 133 selects either the CEC signal supplied from HDMI® source 71 or the partial signal supplied from the converting unit 131, at a timing when the HDMI® source 71 transmits data to the HDMI® sink 72, and transmits the selected CEC signal or partial signal to the receiver 82 via the CEC line 84.

Further, the switch 133 receives either the CEC signal transmitted from the receiver 82 via the CEC line 84 or the partial signal of the differential signals corresponding to Rx data, at a timing when the HDMI® source 71 receives data transmitted from the HDMI® sink 72, and supplies the received CEC signal or partial signal to the HDMI® source 71 or the decoding unit 132.

The switching control unit 121 controls the switch 133 to change over the switch 133 to make the switch select one of the signals supplied to the switch 133. The timing control unit 122 controls a reception timing of differential signals at the decoding unit 132.

Further, the HDMI® sink 72 is constituted of the receiver 82, a timing control unit 123, and a switching control unit 124. In addition, the receiver 82 has a converting unit 134, a switch 135, and a decoding unit 136.

The converting unit 134 is constituted of, e.g., a differential amplifier, and supplied with Rx data. Under control of the timing control unit 123, the converting unit 134 converts the supplied Rx data into differential signals having two partial signals, and transmits the signals obtained by conversion to the transmitter 81 via the CEC line 84 and the signal line 141. Namely, the converting unit 134 supplies one partial signal constituting the differential signals obtained by conversion to the switch 135 via the CEC line 84, more specifically, via the signal line provided in the receiver 82 and connected to the CEC line 84 of the HDMI® cable 35, and also supplies the other partial signal constituting the differential signals to the transmitter 81 via the signal line 141, more specifically, via the signal line provided in the transmitter 81 and connected to the signal line 141 of the HDMI® cable 35.

At a timing when data is received, the switch 135 is supplied with the CEC signal from the transmitter 81 or the partial signal constituting the differential signals corresponding to Tx data from the transmitter 81, and at a timing when data is transmitted, the switch 135 is supplied with the partial signal constituting the differential signals corresponding to Rx data from the converting unit 134 or the CEC signal from the HDMI® sink 72. Under control of the switching control unit 124, the switch 135 selectively outputs the CEC signal from the transmitter 81, the CEC signal from the HDMI® sink 72, the partial signal constituting the differential signals corresponding to Tx data, or the partial signal constituting the differential signals corresponding to Rx data.

Namely, the switch 135 selects either the CEC signal supplied from HDMI® sink 72 or the partial signal supplied from the converting unit 134, at a timing when the HDMI® sink 72 transmits data to the HDMI® source 71, and transmits the selected CEC signal or the partial signal to the transmitter 81 via the CEC line 84.

Further, the switch 135 receives either the CEC signal transmitted from the transmitter 81 via the CEC line 84 or the partial signal of the differential signals corresponding to Tx data, at a timing when the HDMI® sink 72 receives data transmitted from the HDMI® source 71, and supplies the received CEC signal or the partial signal to the HDMI® sink 72 or the decoding unit 136.

The decoding unit 136 is constituted of, e.g., a differential amplifier whose input terminals are connected to the CEC line 84 and the signal line 141. The decoding unit 136 receives differential signals transmitted from the transmitter 81 via the CEC line 84 and the signal line 141, i.e., the differential signals constituted of the partial signal on the CEC line 84 and the partial signal on the signal line 141, and decodes the differential signals to output original Tx data.

The switching control unit 124 controls the switch 135 to change over the switch 135 to make the switch 135 select one of the signals supplied to the switch 135. The timing control unit 123 controls a transmission timing of differential signals at the converting unit 134.

Further, the HDMI® source 71 and HDMI® sink 72 are structured as shown in, e.g., FIG. 7, in a case where the HDMI® source 71 and HDMI® sink 72 perform IP communication by full duplex communication using the CEC line 84 and the signal line 141 connected to the reserved pin, and using the signal line for transmitting the SDA signal and the signal line for transmitting the SCL signal. Note that in FIG. 7, elements corresponding to those shown in FIG. 6 are represented by identical symbols, and the description thereof is omitted as appropriate.

The HDMI® source 71 is constituted of a transmitter 81, a switching control unit 121, and a switching control unit 171. The transmitter 81 has a converting unit 131, a switch 133, a switch 181, a switch 182, and a decoding unit 183.

At a timing when data is transmitted, the switch 181 is supplied with the SDA signal from the HDMI® source 71, and at a timing when data is received, the switch is supplied with the SDA signal from the receiver 82 or the partial signal constituting the differential signals corresponding to Rx data from the receiver 82. Under control of the switching control unit 171, the switch 181 selectively outputs the SDA signal from the HDMI® source 71, the SDA signal from the receiver 82 or the partial signal constituting the differential signals corresponding to Rx data.

Namely, at a timing when the HDMI® source 71 receives data transmitted from the HDMI® sink 72, the switch 181 receives the SDA signal transmitted from the receiver 82 via an SDA line 191 which is the signal line for transmitting the SDA signal or the partial signal of the differential signals corresponding to Rx data, and supplies the received SDA signal or the partial signal to the HDMI® source 71 or the decoding unit 183.

Further, at a timing when the HDMI® source 71 transmits data to the HDMI® sink 72, the switch 181 transmits the SDA signal supplied from the HDMI® source 71, to the receiver 82 via the SDA line 191, or transmits no signal to the receiver 82.

At a timing when data is transmitted, the switch 182 is supplied with the SCL signal from the HDMI® source 71, and at a timing when data is received, the switch 182 is supplied with the partial signal constituting the differential signals corresponding to Rx data from the receiver 82. Under control of the switching control unit 171, the switch 182 selectively outputs either the SCL signal or the partial signal constituting the differential signals corresponding to Rx data.

Namely, at a timing when the HDMI® source 71 receives data transmitted from the HDMI® sink 72, the switch 182 receives the partial signal of the differential signals corresponding to Rx data transmitted from the receiver 82 via an SCL line 192 which is a signal line for transmitting the SCL signal, and supplies the received partial signal to the decoding unit 183, or receives no signal.

Further, at a timing when the HDMI® source 71 transmits data to the HDMI® sink 72, the switch 182 transmits the SCL signal supplied from the HDMI® source 71, to the receiver 82 via the SCL line 192, or transmits no signal to the receiver.

The decoding unit 183 is constituted of, e.g., a differential amplifier whose input terminals are connected to the SDA line 191 and the SCL line 192. The decoding unit 183 receives differential signals transmitted from the receiver 82 via the SDA line 191 and SCL line 192, i.e., the differential signals constituted of the partial signal on the SDA line 191 and the partial signal on the SCL line 192, and decodes the differential signals to output original Rx data.

The switching control unit 171 controls the switch 181 and the switch 182 to change over the switch 181 and the switch 182 to make the switch 181 and the switch 182 select ones of the signals supplied to the switches.

In addition, the HDMI® sink 72 is constituted of a receiver 82, a switching control unit 124, and a switching control unit 172. Further, the receiver 82 has a switch 135, a decoding unit 136, a converting unit 184, a switch 185, and a switch 186.

The converting unit 184 is constituted of, e.g., a differential amplifier, and supplied with Rx data. The converting unit 184 converts the supplied Rx data into differential signals constituted of two partial signals, and transmits the differential signals obtained by conversion to the transmitter 81 via the SDA line 191 and the SCL line 192. Namely, the converting unit 184 transmits one partial signal constituting the differential signals obtained by conversion to the transmitter 81 via the switch 185 and also supplies the other partial signal constituting the differential signals to the transmitter 81 via the switch 186.

At a timing when data is transmitted, the switch 185 is supplied with the partial signal constituting the differential signals corresponding to Rx data from the converting unit 184 or the SDA signal from the HDMI® sink 72, and at a timing when data is received, the switch is supplied with the SDA signal from the transmitter 81. Under control of the switching control unit 172, the switch 185 selectively outputs the SDA signal from the HDMI® sink 72, the SDA signal from the transmitter 81 or the partial signal constituting the differential signals corresponding to Rx data.

Namely, at a timing when the HDMI® sink 72 receives data transmitted from the HDMI® source 71, the switch 185 receives the SDA signal transmitted from the transmitter 81 via the SDA line 191, and supplies the received SDA signal to the HDMI® sink 72, or receives no signal.

Further, at a timing when the HDMI® sink 72 transmits data to the HDMI® source 71, the switch 185 transmits the SDA signal supplied from the HDMI® sink 72 or the partial signal supplied from the converting unit 184 to the transmitter 81 via the SDA line 191.

At a timing when data is transmitted, the switch 186 is supplied with the partial signal constituting the differential signals corresponding to Rx data from the converting unit 184, and at a timing when data is received, the switch 186 is supplied with the SCL signal from the transmitter 81. Under control of the switching control unit 172, the switch 186 selectively outputs either the partial signal constituting the differential signals corresponding to Rx data or the SCL signal.

Namely, at a timing when the HDMI® sink 72 receives data transmitted from the HDMI® source 71, the switch 186 receives the SCL signal transmitted from the transmitter 81 via the SCL line 192, and supplies the received SCL signal to the HDMI® sink 72 or received no signal.

Further, at a timing when the HDMI® sink 72 transmits data to the HDMI® source 71, the switch 186 transmits the partial signal supplied from the converting unit 184 to the transmitter 81 via the SCL line 192 or transmits no signal.

The switching control unit 172 controls the switch 185 and the switch 186 to change over the switch 185 and the switch 186 to make the switch 185 and the switch 186 select ones of the signals supplied to the switches.

Incidentally, when the HDMI® source 71 and the HDMI® sink 72 perform IP communication, whether half duplex communication or full duplex communication is possible depends on each structure of the HDMI® source 71 and the HDMI® sink 72. Therefore, by referring to E-EDID received from the HDMI® sink 72, the HDMI® source 71 judges to perform half duplex communication, full duplex communication, or bidirectional communication through transfer of the CEC signal.

E-EDID received by the HDMI® source 71 is constituted of a basic block and an expansion block such as shown in FIG. 8.

Data defined by the E-EDID1.3 specifications expressed by "E-EDID1.3 Basic Structure" is disposed at the start of the basic block of E-EDID, followed by timing information for retaining compatibility with conventional EDID expressed by "Preferred timing" and timing information different from "Preferred timing" for retaining compatibility with conventional EDID expressed by "2nd timing".

Sequentially disposed in the basic block following "2nd timing" are information representative of a display device name expressed by "Monitor NAME" and information representative of the number of pixels capable of being displayed at aspect ratios of 4:3 and 16:9 expressed by "Monitor Range Limits".

On the other hand, at the start of the expansion block, information on right/left speakers represented by "Speaker Allocation" is disposed, followed by: data describing information on an image size, a frame rate, interlace or progressive capable of being displayed, and data describing an aspect ratio, expressed by "VIDEO SHORT"; data describing information on an audio codec method capable of being reproduced, a sampling frequency, a cut-off band, a codec bit number and the like, expressed by "AUDIO SHORT"; and information on right/left speaker expressed by "Speaker Allocation" sequentially in this order recited.

Sequentially disposed in the expansion block following "Speaker allocation" are data custom-defined for each maker expressed by "Vender Specific", timing information expressed by "3rd timing" for retaining compatibility with conventional EDID, and timing information expressed by "4th timing" for retaining compatibility with conventional EDID.

Data expressed by "Vender Specific" has a data structure shown in FIG. 9. Namely, the data expressed by "Vender Specific" is provided with 0-th to N-th blocks each having one byte.

Disposed in the 0-th block at the start of data expressed by "Vender Specific" is information representative of a header indicating the data area of the data "Vender Specific" expressed by "Vendor-Specific tag code (=3) and information representative of a length of the data "Vender Specific" expressed by "Length (=N)".

Disposed in the first to third blocks is information on a number "0x000c03" registered for HDMI® and expressed by "24 bit IEEE Registration Identifier (0x000c03) LSB first". Disposed in the fourth and fifth blocks is information representative of physical addresses of 24 bit sink apparatus represented by "A", "B", "C", and "D", respectively.

Disposed in the sixth block are: a flag indicating a function supported by each sink apparatus expressed by "Supports-AI"; information for designating the numbers of bits per pixel expressed by "DC-48 bit", "DC-36 bit" and "DC-30 bit", respectively; a flag indicating whether each sink apparatus can transmit an image of YCbCr 4:4:4, expressed by "DC-Y444"; and a flag indicating whether each sink apparatus can match a dual DVI (Digital Visual Interface), expressed by "DVI-Dual".

Disposed in the seventh block is information representative of the highest frequency of a pixel clock of TMDS expressed by "Max-TMDS-Clock". Disposed in the eighth block are a flag indicating presence/absence of delay information of video and audio signals expressed by "Latency, a full duplex flag indicating whether full duplex communication is possible, expressed by "Full Duplex", and a half duplex flag indicating whether half duplex communication is possible, expressed by "Half Duplex".

For example, the set full duplex flag (e.g., set to "1") indicates that the HDMI® sink 72 has a function of performing full duplex communication, i.e., the HDMI® sink 72 has the structure shown in FIG. 7, whereas the reset full duplex flag (e.g., set to "0") indicates that the HDMI® sink 72 does not have a function of performing full duplex communication.

Similarly, the set half duplex flag (e.g., set to "1") indicates that the HDMI® sink 72 has a function of performing half duplex communication, i.e., the HDMI® sink 72 has the structure shown in FIG. 6, whereas the reset half duplex flag (e.g., set to "0") indicates that the HDMI® sink 72 does not have a function of performing half duplex communication.

In the ninth block of data expressed by "Vender Specific", delay time data of a progressive image expressed by "Video Latency" is disposed, and in the tenth block, delay time data of sounds accompanied by the progressive image expressed by "Audio Latency" is disposed. Further, in the eleventh block, delay time data of an interlayer image expressed by "Interlaced Video Latency" is disposed, and in the twelfth block, delay time data of sounds accompanied by the interlace image expressed by "Interlaced Audio Latency" is disposed.

Based on the full duplex flag and half duplex flag contained in E-EDID received from the HDMI® sink 72, the HDMI® source 71 judges to perform the half duplex communication, full duplex communication, or bidirectional communication through transfer of the CEC signal, and performs bidirectional communication with the HDMI® sink 72 in accordance with the judged results.

For example, if the HDMI® source 71 has the structure shown in FIG. 6, the HDMI® source 71 can perform half duplex communication with the HDMI® sink 72 shown in FIG. 6, but cannot perform half duplex communication with the HDMI® sink 72 shown in FIG. 7.

Therefore, when the power of the electronic apparatus mounting the HDMI® source 71 is turned on, the HDMI® source 71 starts a communication process to perform bidirectional communication corresponding to the function possessed by the HDMI® sink 72 connected to the HDMI® source 71.

Hereinafter, with reference to the flowchart shown in FIG. 10, description will be made on a communication process to be executed by the HDMI® source 71 shown in FIG. 6.

At Step S11 the HDMI® source 71 judges whether a new electronic apparatus is connected to the HDMI® source 71. For example, the HDMI® source 71 judges whether the new electronic apparatus mounting the HDMI® sink 72 is connected or not, in accordance with an amplitude of a voltage applied to the pin which is called "Hot Plug Detect" and connected to the signal line 86.

If it is judged at Step S11 that the new electronic apparatus is not connected, communication is not performed to thereafter terminate the communication process.

On the other hand, if it is judged at Step S11 that the new electronic apparatus is connected, then at Step S12 the switching control unit 121 controls the switch 133 to change over the switch 133 to select the CEC signal from the HDMI® source 71 when data is transmitted and the CEC signal from the receiver 82 when data is received.

At Step S13 the HDMI® source 71 receives E-EDID transmitted from the HDMI® sink 72 via DDC 83. Namely, when a connection of the HDMI® source 71 is detected, the HDMI® sink 72 reads E-EDID from EDIDROM 85 and transmits the read E-EDID to the HDMI® source 71 via DDC 83. The HDMI® source 71 receives E_EDID transmitted from the HDMI® sink 72.

At Step S14 the HDMI® source 71 judges whether it is possible to perform half duplex communication with the HDMI® sink 72. Namely, the HDMI® source 71 refers to E-EDID received from the HDMI® sink 72 and judges whether the half duplex flag "Half Duplex" shown in FIG. 9 is set. For example, if the half duplex flag is set, the HDMI® source 71 judges that it is possible to perform bidirectional IP communication by a half duplex communication method, i.e., half duplex communication.

If it is judged at Step S14 that half duplex communication is possible, at Step S15 the HDMI® source 71 transmits a signal to the effect that IP communication by a half duplex communication method is performed using the CEC line 84 and signal line 141, as channel information representative of a channel to be used for bidirectional communication, to the receiver 82 via the switch 133 and the CEC line 84.

Namely, if the half duplex flag is set, the HDMI® source 71 can know that the HDMI® sink 72 has the structure shown in FIG. 6 and that it is possible to perform half duplex communication using the CEC line 84 and signal line 141. The HDMI® source 71 transmits the channel information to the HDMI® sink 72 to notify to the effect that half duplex communication is performed.

At Step S16 the switching control unit 121 controls the switch 133 to change over the switch 133 to select the differential signals corresponding to Tx data from the converting unit 131 when data is transmitted and the differential signals corresponding to Rx data from the receiver 82 when data is received.

At Step S17 each component of the HDMI® source 71 performs bidirectional IP communication with the HDMI® sink 72 by the half duplex communication method to thereafter terminate the communication process. Namely, when data is transmitted, the converting unit 131 converts Tx data supplied from the HDMI® source 71 into differential signals, and supplies one partial signal constituting the differential signals obtained by conversion to the switch 133 and the other partial signal to the receiver 82 via the signal line 141. The switch 133 transmits the partial signal supplied from the converting unit 131 to the receiver 82 via the CEC line 84. In this manner, the differential signals corresponding to Tx data are transmitted from the HDMI® source 71 to the HDMI® sink 72.

When data is received, the decoding unit 132 receives differential signals corresponding to Rx data transmitted from the receiver 82. Namely, the switch 133 receives the partial signal of the differential signals corresponding to Rx data transmitted from the receiver 82 via the CEC line 84, and supplies the received partial signal to the decoding unit 132. Under control of the timing control unit 122, the decoding unit 132 decodes the differential signals constituted of the partial signal supplied from the switch 133 and the partial signal supplied from the receiver 82 via the signal line 141 to the original Rx data and output the original Rx data to the HDMI® source 71.

In this manner, the HDMI® source 71 transfers various data such as control data, pixel data and audio data with the HDMI® sink 72.

If it is judged at Step S14 that half duplex communication is not possible, at Step S18 each component of the HDMI® source 71 performs bidirectional communication with the HDMI® sink 72 through transmission/reception of the CEC signal to thereafter terminate the communication process.

Namely, when data is transmitted, the HDMI® source 71 transmits the CEC signal to the receiver 82 via the switch 133 and CEC line 84, and when data is received, the HDMI® source 71 receives the CEC signal transmitted from the receiver 82 via the switch 133 and CEC line 84 to transfer control data with the HDMI® sink 72.

In this manner, the HDMI® source 71 refers to the half duplex flag and performs half duplex communication with the HDMI® sink 72 capable of half duplex communication by using the CEC line 84 and signal line 141.

As described above, high speed bidirectional communication can be performed while retaining compatibility with conventional HDMI®, by selecting transmission data and reception data by changing over the switch 133 and performing half duplex communication, i.e., IP communication by a half duplex communication method, with the HDMI® sink 72 by using the CEC line 84 and signal line 141.

Further, similar to the HDMI® source 71, the HDMI® sink 72 starts a communication process when the power of the electronic apparatus mounting the HDMI® sink 72 is turned on, and performs bidirectional communication with the HDMI® source 71.

Hereinafter, with reference to the flowchart of FIG. 11, description will be made on a communication process to be executed by the HDMI® sink 72 shown in FIG. 6.

At Step S41 the HDMI® sink 72 judges whether a new electronic apparatus is connected to the HDMI® sink 72. For example, the HDMI® sink 72 judges whether the new electronic apparatus mounting the HDMI® source 71 is connected or not, in accordance with an amplitude of a voltage applied to the pin which is called "Hot Plug Detect" and connected to the signal line 86.

If it is judged at Step S41 that the new electronic apparatus is not connected, communication is not performed to thereafter terminate the communication process.

On the other hand, if it is judged at Step S41 that the new electronic apparatus is connected, then at Step S42 the switching control unit 124 controls the switch 135 to change over the switch 135 to select the CEC signal from the HDMI® sink 72 when data is transmitted and the CEC signal from the transmitter 81 when data is received.

At Step S43 the HDMI® sink 72 reads E-EDID from EDIDROM 85, and transmits the read E-EDID to the HDMI® source 71 via DDC 83.

At Step S44 the HDMI® sink 72 judges whether channel information transmitted from the HDMI® source 71 is received.

Namely, channel information representative of a bidirectional communication channel is transmitted from the HDMI® source 71 in accordance with the functions possessed by the HDMI® source 71 and HDMI® sink 72. For example, if the HDMI® source 71 has the structure shown in FIG. 6, the HDMI® source 71 and HDMI® sink 72 can perform half duplex communication using the CEC line 84 and signal line 141. Therefore, the channel information to the effect that IP communication is performed using the CEC line 84 and signal line 141 is transmitted from the HDMI® source 71 to the HDMI® sink 72. The HDMI® sink 72 judges that the channel information is received, after the channel information transmitted from the HDMI® source 71 via the switch 135 and CEC line 84.

On the other hand, if the HDMI® source 71 does not have the half duplex communication function, the channel information is not transmitted from the HDMI® source 71 to the HDMI® sink 72 so that the HDMI® sink 72 judges that the channel information is not received.

If it is judged at Step S44 that the channel information is received, the process advances to Step S45 whereat the switching control unit 124 controls the switch 135 to change over the switch 135 to select the differential signals corresponding to Rx data from the converting unit 134 when data is transmitted and the differential signals corresponding to Tx data from the transmitter 81 when data is received.

At Step S46 each component of the HDMI® sink 72 performs bidirectional IP communication with the HDMI® source 71 by the half duplex communication method to thereafter terminate the communication process. Namely, when data is transmitted, under control of the timing control unit 123, the converting unit 134 converts Rx data supplied from the HDMI® sink 72 into differential signals, and supplies one partial signal constituting the differential signals obtained by conversion to the switch 135 and the other partial signal to the transmitter 81 via the signal line 141. The switch 135 transmits the partial signal supplied from the converting unit 134 to the transmitter 81 via the CEC line 84. In this manner, the differential signals corresponding to Rx data are transmitted from the HDMI® sink 72 to the HDMI® source 71.

When data is received, the decoding unit 136 receives differential signals corresponding to Tx data transmitted from the transmitter 81. Namely, the switch 135 receives the partial signal of the differential signals corresponding to Tx data transmitted from the transmitter 81 via the CEC line 84, and supplies the received partial signal to the decoding unit 136. The decoding unit 136 decodes the differential signals constituted of the partial signal supplied from the switch 135 and the partial signal supplied from the transmitter 81 via the signal line 141 to the original Tx data and output the original Tx data to the HDMI® sink 72.

In this manner, the HDMI® sink 72 transfers various data such as control data, pixel data and audio data with the HDMI® source 71.

If it is judged at Step S44 that the channel information is not received, at Step S47 each component of the HDMI® sink 72 performs bidirectional communication with the HDMI® source 71 through transmission/reception of the CEC signal to thereafter terminate the communication process.

Namely, when data is transmitted, the HDMI® sink 72 transmits the CEC signal to the transmitter 81 via the switch 135 and the CEC line 84, and when data is received, the HDMI® sink 72 receives the CEC signal transmitted from the transmitter 81 via the switch 135 and CEC line 84 to transfer control data with the HDMI® source 71.

In this manner, when the channel information is received, the HDMI® sink 72 performs half duplex communication with the HDMI® sink 72 by using the CEC line 84 and signal line 141.

As described above, high speed bidirectional communication can be performed while retaining compatibility with conventional HDMI®, by performing half duplex communication using the CEC line 84 and signal line 141 between the HDMI® sink 72 and HDMI® source 71 by changing over the switch 135 to select transmission data and reception data.

Further, if the HDMI® source 71 has the structure shown in FIG. 7, in the communication process the HDMI® source 71 judges from the full duplex flag contained in E-EDID whether the HDMI® sink 72 has a full duplex communication function, and performs bidirectional communication in accordance with the judged result.

With reference to the flowchart shown in FIG. 12, description will be made on a communication process to be executed by the HDMI® source 71 shown in FIG. 7.

At Step S71 the HDMI® source 71 judges whether a new electronic apparatus is connected to the HDMI® source 71. If it is judged at Step S71 that the new electronic apparatus is not connected, communication is not performed to thereafter terminate the communication process.

On the other hand, if it is judged at Step S71 that the new electronic apparatus is connected, then at Step S72 the switching control unit 171 controls the switches 181 and 182 to change over the switches 181 and 182 to make the switch 181 select the SDA signal from the HDMI® source 71 and make the switch 182 select the SCL signal from the HDMI® source 71, when data is transmitted and to make the switch 181 select the SDA signal from the HDMI® source 71 when data is received.

At Step S73 the switching control unit 121 controls the switch 133 to change over the switch 133 to select the CEC signal from the HDMI® source 71 when data is transmitted and the CEC signal from the receiver 82 when data is received.

At Step S74 the HDMI® source 71 receives E-EDID transmitted from the HDMI® sink 72 via the SDA line 191 of DDC 83. Namely, when a connection of the HDMI® source 71 is detected, the HDMI® sink 72 reads E-EDID from EDIDROM 85 and transmits the read E-EDID to the HDMI® source 71 via the SDA line 191 of DDC 83. The HDMI® source 71 receives E-EDID transmitted from the HDMI® sink 72.

At Step S75 the HDMI® source 71 judges whether it is possible to perform full duplex communication with the HDMI® sink 72. Namely, the HDMI® source 71 refers to E-EDID received from the HDMI® sink 72 and judges whether the full duplex flag "Full Duplex" shown in FIG. 9 is set. For example, if the full duplex flag is set, the HDMI® source 71 judges that it is possible to perform bidirectional IP communication by a full duplex communication method, i.e., full duplex communication.

If it is judged at Step S75 that full duplex communication is possible, at Step S76 the switching control unit 171 controls the switches 181 and 182 to change over the switches 181 and 182 to select the differential signals corresponding to Rx data from the receiver 82 when data is received.

Namely, regarding the partial signals constituting the differential signals corresponding to Rx data transmitted from the receiver 82 when data is received, the switching control unit 171 changes over the switches 181 and 182 to make the switch 181 select the partial signal transmitted via the SDA line 191 and make the switch 182 select the partial signal transmitted via the SCL line 192.

The SDA line 191 and the SCL line 192 constituting DDC 83 are not used after E-EDID is transmitted from the HDMI® sink 72 to the HDMI® source 71, i.e., transmission/reception of the SDA and SCL signals via the SDA line 191 and SCL line 192 is not performed. It is therefore possible to use the SDA line 191 and SCL line 192 as transmission lines of Rx data during full duplex communication.

At Step S77 the HDMI® source 71 transmits a signal to the effect that IP communication by a full duplex communication method is performed using the CEC line 84 and signal line 141 and the SDA line 191 and SCL line 192 as channel information representative of a channel to be used for bidirectional communication, to the receiver 82 via the switch 133 and CEC line 84.

Namely, if the full duplex flag is set, the HDMI® source 71 can know that the HDMI® sink 72 has the structure shown in FIG. 7 and that it is possible to perform full duplex communication using the CEC line 84 and signal line 141 and the SDA line 191 and SCL line 192. The HDMI® source 71 transmits the channel information to the HDMI® sink 72 to notify to the effect that full duplex communication is performed.

At Step S78 the switching control unit 121 controls the switch 133 to change over the switch 133 to select the differential signals corresponding to Tx data from the converting unit 131 when data is transmitted. Namely, the switching control unit 121 changes over the switch 133 to select the partial signal of the differential signals corresponding to Tx data and supplied to the switch 133 from the converting unit 131.

At Step S79 each component of the HDMI® source 71 performs bidirectional IP communication with the HDMI® sink 72 by the full duplex communication method to thereafter terminate the communication process. Namely, when data is transmitted, the converting unit 131 converts Tx data supplied from the HDMI® source 71 into differential signals, and supplies one partial signal constituting the differential signals obtained by conversion to the switch 133 and the other partial signal to the receiver 82 via the signal line 141. The switch 133 transmits the partial signal supplied from the converting unit 131 to the receiver 82 via the CEC line 84. In this manner, the differential signals corresponding to Tx data are transmitted from the HDMI® source 71 to the HDMI® sink 72.

Further, when data is received, the decoding unit 183 receives differential signals corresponding to Rx data transmitted from the receiver 82. Namely, the switch 181 receives the partial signal of the differential signals corresponding to Rx data transmitted from the receiver 82 via the SDA line 191, and supplies the received partial signal to the decoding unit 183. Further, the switch 182 receives the other partial signal of the differential signals corresponding to Rx data transmitted from the receiver 82 via the SCL line 192, and supplies the received partial signal to the decoding unit 183. The decoding unit 183 decodes the differential signals constituted of the partial signals supplied from the switches 181 and 182 to the original Rx data and output the original Rx data to the HDMI® source 71.

In this manner, the HDMI® source 71 transfers various data such as control data, pixel data and audio data with the HDMI® sink 72.

Further, if it is judged at Step S75 that full duplex communication is not possible, at Step S80 each component of the HDMI® source 71 performs bidirectional communication with the HDMI® sink 72 through transmission/reception of the CEC signal to thereafter terminate the communication process.

Namely, when data is transmitted, the HDMI® source 71 transmits the CEC signal to the receiver 82 via the switch 133 and CEC line 84, and when data is received, the HDMI® source 71 receives the CEC signal transmitted from the receiver 82 via the switch 133 and CEC line 84 to transfer control data with the HDMI® sink 72.

In this manner, the HDMI® source 71 refers to the full duplex flag and performs full duplex communication with the HDMI® sink 72 capable of full duplex communication by using the CEC line 84 and signal line 141 and the SDA line 191 and SCL line 192.

As described above, high speed bidirectional communication can be performed while retaining compatibility with conventional HDMI®, by selecting transmission data and reception data by changing over the switches 133, 181 and 182 and performing full duplex communication with the HDMI® sink 72 by using the CEC line 84 and signal line 141 and the SDA line 191 and SCL line 192.

Similar to the HDMI® sink 72 shown in FIG. 6, if the HDMI® sink 72 has the structure shown in FIG. 7, the HDMI® sink 72 executes a communication process to perform bidirectional communication with the HDMI® source 71.

Hereinafter, with reference to the flowchart of FIG. 13, description will be made on a communication process to be executed by the HDMI® sink 72 shown in FIG. 7.

At Step S111 the HDMI® sink 72 judges whether a new electronic apparatus is connected to the HDMI® sink 72. If it is judged at Step S111 that the new electronic apparatus is not connected, communication is not performed to thereafter terminate the communication process.

On the other hand, if it is judged at Step S111 that the new electronic apparatus is connected, then at Step S112 the switching control unit 172 controls the switches 185 and 186 to change over the switches 185 and 186 to make the switch 185 select the SDA signal from the HDMI® sink 72 when data is transmitted, and to make the switch 185 select the SDA signal from the transmitter 81 and make the switch 186 select the SCL signal from the transmitter 81 when data is received.

At Step S113 the switching control unit 124 controls the switch 135 to change over the switch 135 to select the CEC signal from the HDMI® sink 72 when data is transmitted and select the CEC signal from the transmitter 81 when data is received.

At Step S114 the HDMI® sink 72 reads E-EDID from EDIDROM 85, and transmits the read E-EDID to the HDMI® source 71 via the switch 185 and the SDA line 191 of DDC 83.

At Step S115 the HDMI® sink 72 judges whether channel information transmitted from the HDMI® source 71 is received.

Namely, channel information representative of a bidirectional communication channel is transmitted from the HDMI® source 71 in accordance with the functions possessed by the HDMI® source 71 and HDMI® sink 72. For example, if the HDMI® source 71 has the structure shown in FIG. 7, the HDMI® source 71 and HDMI® sink 72 can perform full duplex communication. The HDMI® source 71 transmits channel information to the effect that IP communication by a full duplex communication method is performed using the CEC line 84 and signal line 141 and the SDA line 191 and SCL line 192, to the HDMI® sink 72. The HDMI® sink 72 judges that the channel information is received, after the channel information transmitted from the HDMI® source 71 via the switch 135 and CEC line 84.

On the other hand, if the HDMI® source 71 does not have the full duplex communication function, the channel information is not transmitted from the HDMI® source 71 to the HDMI® sink 72 so that the HDMI® sink 72 judges that the channel information is not received.

If it is judged at Step S115 that the channel information is received, the process advances to Step S116 whereat the switching control unit 172 controls the switches 185 and 186 to change over the switches 185 and 186 to select the differential signals corresponding to Rx data from the converting unit 184 when data is transmitted.

At Step S117 the switching control unit 124 controls the switch 135 to change over switch 135 to select the differential signals corresponding to Tx data from the transmitter 81 when data is received.

At Step S118 each component of the HDMI® sink 72 performs bidirectional IP communication with the HDMI® source 71 by the full duplex communication method to thereafter terminate the communication process. Namely, when data is transmitted, the converting unit 184 converts Rx data supplied from the HDMI® sink 72 into differential signals, and supplies one partial signal constituting the differential signals obtained by conversion to the switch 185 and the other partial signal to the switch 186. The switches 185 and 186 transmit the partial signals supplied from the converting unit 184 to the transmitter 81 via the SDA line 191 and SCL line 192. In this manner, the differential signals corresponding to Rx data are transmitted from the HDMI® sink 72 to the HDMI® source 71.

Further, when data is received, the decoding unit 136 receives differential signals corresponding to Tx data transmitted from the transmitter 81. Namely, the switch 135 receives the partial signal of the differential signals corresponding to Tx data transmitted from the transmitter 81 via the CEC line 84, and supplies the received partial signal to the decoding unit 136. The decoding unit 136 decodes the differential signals constituted of the partial signal supplied from the switch 135 and the partial signal supplied from the transmitter 81 via the signal line 141 to the original Tx data and output the original Tx data to the HDMI® sink 72.

In this manner, the HDMI® sink 72 transfers various data such as control data, pixel data and audio data with the HDMI® source 71.

If it is judged at Step S115 that the channel information is not received, at Step S119 each component of the HDMI® sink 72 performs bidirectional communication with the HDMI® source 71 through transmission/reception of the CEC signal to thereafter terminate the communication process.

In this manner, when the channel information is received, the HDMI® sink 72 performs full duplex communication with the HDMI® sink 72 via the CEC line 84 and signal line 141 and the SDA line 191 and SCL line 192.

As described above, high speed bidirectional communication can be performed while retaining compatibility with conventional HDMI®, by performing full duplex communication between the HDMI® sink 72 and HDMI® source 71 using the CEC line 84 and signal line 141 and the SDA line 191 and SCL line 192 and by changing over the switches 135, 185 and 186 to select transmission data and reception data.

Note that, although in the example in FIG. 7, the HDMI® source 71 is structured such that the converting unit 131 is connected to the CEC line 84 and signal line 141, and the decoding unit 183 is connected to the SDA line 191 and SCL line 192, the structure may be that the decoding unit 183 is connected to the CEC line 84 and signal line 141 and the converting unit 131 is connected to the SDA line 191 and SCL line 192.

In such case, the switches 181 and 182 are connected to the CEC line 84 and signal line 141 respectively and to the decoding unit 183, and the switch 133 is connected to the SDA line 191 and to the converting unit 131.

Similarly, the HDMI® sink 72 shown in FIG. 7 may be structured such that the converting unit 184 is connected to the CEC line 84 and signal line 141 and the decoding unit 136 is connected to the SDA line 191 and SCL line 192. In such case, the switches 185 and 186 are connected to the CEC line 84 and signal line 141 respectively and to the converting unit 184, and the switch 135 is connected to the SDA line 191 and to the decoding unit 136.

Further, in FIG. 6, the CEC line 84 and signal line 141 may be replaced with the SDA line 191 and SCL line 192. Namely, the converting unit 131 and decoding unit 132 of the HDMI® source 71, and the converting unit 134 and decoding unit 136 of the HDMI® sink 72 are connected to the SDA line 191 and SCL line 192 to make the HDMI® source 71 and HDMI® sink 72 perform IP communication by a half duplex communication method. In this case, a connection of an electronic apparatus may be detected by utilizing a reserved pin of the connector connected to the signal line 141.

Further, each of the HDMI® source 71 and HDMI® sink 72 may have both the half duplex communication function and the full duplex communication function. In this case, the HDMI® source 71 and HDMI® sink 72 can perform IP communication by a half duplex communication method or full duplex communication method in accordance with the functions possessed by the connected electronic apparatus.

If each of the HDMI® source 71 and HDMI® sink 72 has both the half duplex communication function and the full duplex communication function, the HDMI® source 71 and HDMI® sink 72 are structured, for example, as shown in FIG. 14. Note that, in FIG. 14, parts corresponding to those shown in FIG. 6 or 7 are represented by identical symbols, and the description thereof is omitted where proper.

An HDMI® source 71 shown in FIG. 14 is constituted of a transmitter 81, a switching control unit 121, a timing control unit 122 and a switching control unit 171. The transmitter 81 has a converting unit 131, a decoding unit 132, a switch 133, a switch 181, a switch 182 and a decoding unit 183. Namely, the HDMI® source 71 shown in FIG. 14 has a structure that the timing control unit 122 and decoding unit 132 shown in FIG. 6 are added to the HDMI® source 71 shown in FIG. 7.

An HDMI® sink 72 shown in FIG. 14 is constituted of a receiver 82, a timing control unit 123, a switching control unit 124, and a switching control unit 172. The receiver 82 has a converting unit 134, a switch 135, a decoding unit 136, a converting unit 184, a switch 185 and a switch 186. Namely, the HDMI® sink 72 shown in FIG. 14 has a structure that the timing control unit 123 and converting unit 134 shown in FIG. 6 are added to the HDMI® sink 72 shown in FIG. 7.

Next, description will be made on a communication process to be executed by the HDMI® source 71 and HDMI® sink 72 shown in FIG. 14.

First, with reference to the flowchart shown in FIG. 15, description will be made on a communication process to be executed by the HDMI® source 71 shown in FIG. 14. Note that processes at Steps S151 to S154 are similar to the processes at Steps S71 to S74 shown in FIG. 12, and so the description thereof is omitted.

At Step S155 the HDMI® source 71 judges whether it is possible to perform full duplex communication with the HDMI® sink 72. Namely, the HDMI® source 71 refers to E-EDID received from the HDMI® sink 72 and judges whether the full duplex flag "Full Duplex" shown in FIG. 9 is set.

If it is judged at Step S155 that full duplex communication is possible, i.e., if the HDMI® sink 72 shown in FIG. 14 or FIG. 7 is connected to the HDMI® source 71, at Step S156 the switching control unit 171 controls the switches 181 and 182 to change over the switches 181 and 182 to select the differential signals corresponding to Rx data from the receiver 82 when data is received.

If it is judged at Step S155 that full duplex communication is not possible, at Step S157 the HDMI® source 71 judges whether half duplex communication is possible. Namely, the HDMI® source 71 refers to the received E-EDID and judges whether the half duplex flag "Half Duplex" shown in FIG. 9 is set. In other words, the HDMI® source 71 judges whether the HDMI® sink 72 shown in FIG. 6 is connected to the HDMI® source 71.

If it is judged at Step S157 that half duplex communication is possible, or if the switches 181 and 182 are changed over at Step S156, then at Step S158 the HDMI® source 71 transmits channel information to the receiver 82 via the switch 133 and CEC line 84.

If it is judged at Step S155 that full duplex communication is possible, since the HDMI® sink 72 has the full duplex communication function, the HDMI® source 71 transmits a signal to the effect that IP communication is performed using the CEC line 84 and signal line 141 and the SDA line 191 and SCL line 192, as channel information, to the receiver 82 via the switch 133 and CEC line 84.

If it is judged at Step S157 that half duplex communication is possible, since the HDMI® sink 72 has the half duplex communication function although it does not have the full duplex communication function, the HDMI® source 71 transmits a signal to the effect that IP communication is performed using the CEC line 84 and signal line 141, as channel information, to the receiver 82 via the switch 133 and CEC line 84.

At Step S159 the switching control unit 121 controls the switch 133 to change over the switch 133 to select the differential signals corresponding to Tx data from the converting unit 131 when data is transmitted, and to select the differential signals corresponding to Rx data transmitted from the receiver 82 when data is received. Note that if the HDMI® source 71 and HDMI® sink 72 perform full duplex communication, the differential signals corresponding to Rx data are not transmitted from the receiver 82 via the CEC line 84 and signal line 141 when the HDMI® source 71 receives data, so that the differential signals corresponding to Rx data are not supplied to the decoding unit 132.

At Step S160 each component of the HDMI® source 71 performs bidirectional IP communication with the HDMI® sink 72 to thereafter terminate the communication process.

Namely, when the HDMI® source 71 performs full duplex communication and half duplex communication with the HDMI® sink 72, the converting unit 131 converts Tx data supplied from the HDMI® source 71 into differential signals when data is transmitted, and supplies one partial signal constituting the differential signals obtained by conversion to the receiver 82 via the switch 133 and CEC line 84 and the other partial signal to the receiver 82 via the signal line 141.

Further, when the HDMI® source 71 performs full duplex communication with the HDMI® sink 72 and when data is received, the decoding unit 183 receives the differential signals corresponding to Rx data transmitted from the receiver 82, and decodes the received differential signals to the original Rx data and output the original Rx data to the HDMI® source 71.

On the other hand, when the HDMI® source 71 performs half duplex communication with the HDMI® sink 72 and when data is received, under the control of the timing control unit 122, the decoding unit 132 receives the differential signals corresponding to Rx data transmitted from the receiver 82, and decodes the received differential signals to the original Rx data and output the original Rx data to the HDMI® source 71.

In this manner, the HDMI® source 71 transfers various data such as control data, pixel data and audio data with the HDMI® sink 72.

Further, if it is judged at Step S157 that half duplex communication is not possible, at Step S161 each component of the HDMI® source 71 performs bidirectional communication with the HDMI® sink 72 through transmission/reception of the CEC signal via the CEC line 84 to thereafter terminate the communication process.

In this manner, the HDMI® source 71 refers to the full duplex flag and half duplex flag and performs full or half duplex communication with the HDMI® sink 72 in accordance with the function possessed by the communication partner HDMI® sink 72.

As described above, high speed bidirectional communication can be performed while retaining compatibility with conventional HDMI® and selecting an optimum communication method, by selecting transmission data and reception data by changing over the switches 133, 181 and 182 and performing full or half duplex communication with the HDMI® sink 72 in accordance with the functions possessed by the communication partner HDMI® sink 72.

Next, with reference to the flowchart shown in FIG. 16, description will be made on a communication process to be executed by the HDMI® sink 72 shown in FIG. 14. Note that processes at Steps S191 to S194 are similar to the processes at Steps S111 to S114 shown in FIG. 13, and so the description thereof is omitted.

At Step S195 the HDMI® sink 72 receives channel information transmitted from the HDMI® source 71 via the switch 135 and CEC line 84. Note that if the HDMI® source 71 connected to the HDMI® sink 72 has neither the full duplex communication function nor the half duplex communication function, the channel information will not transmitted from the HDMI® source 71 to the HDMI® sink 72, the HDMI® sink 72 will not receive the channel information.

At Step S196 the HDMI® sink 72 judges from the received channel information whether full duplex communication is performed. For example, the HDMI® sink 72 judges that full duplex communication is performed, if the HDMI® sink 72 receives the channel information to the effect that IP communication is performed using the CEC line 84 and signal line 141 and the SDA line 191 and SCL line 192.

If it is judged at Step S196 that full duplex communication is performed, then at Step S197 the switching control unit 172 controls the switches 185 and 186 to change over the switches 185 and 186 to select the differential signals corresponding to Rx data from the converting unit 184 when data is transmitted.

Further, if it is judged at Step S196 that full duplex communication is not performed, then at Step S198 the HDMI® sink 72 judges from the received channel information whether half duplex communication is performed. For example, the HDMI® sink 72 judges that half duplex communication is performed, if the HDMI® sink 72 receives the channel information to the effect that IP communication using the CEC line 84 and signal line 141 is received.

If it is judged at Step S198 that half duplex communication is performed or if it is judged at Step S197 that the switches 185 and 186 are changed over at Step S197, then at Step 199 the switching control unit 124 controls the switch 135 to change over switch 135 to select the differential signals corresponding to Rx data from the converting unit 134 when data is transmitted and to select the differential signals corresponding to Tx data from the transmitter 81 when data is received.

Note that if the HDMI® source 71 and HDMI® sink 72 perform full duplex communication, the differential signals corresponding to Rx data are not transmitted from the converting unit 134 to the transmitter 81 when data is transmitted at the HDMI® sink 72. Therefore, the differential signals corresponding to Rx data are not supplied to the switch 135.

At Step S200, each component of the HDMI® sink 72 performs bidirectional IP communication with the HDMI® source 71 to thereafter terminate the communication process.

Namely, if the HDMI® sink 72 and HDMI® source 71 perform full duplex communication and when data is transmitted, the converting unit 184 converts Rx data supplied from the HDMI® sink 72 into differential signals, and supplies one partial signal constituting the differential signals obtained by conversion to the transmitter 81 via the switch 185 and SDA line 191 and the other partial signal to the transmitter 81 via the switch 186 and SCL line 192.

Further, if the HDMI® sink 72 and HDMI® source 71 perform half duplex communication and when data is transmitted, the converting unit 134 converts Rx data supplied from the HDMI® sink 72 into differential signals, and supplies one partial signal constituting the differential signals obtained by conversion to the transmitter 81 via the switch 135 and CEC line 84 and the other partial signal to the transmitter 81 via the signal line 141.

Further, if the HDMI® sink 72 and HDMI® source 71 perform full duplex communication and half duplex communication and when data is received, the decoding unit 136 receives the differential signals corresponding to Tx data transmitted from the transmitter 81, and decodes the received differential signals to the original Tx data and output the original Tx data to the HDMI® sink 72.

In addition, if it is judged at Step S198 that half duplex communication is not performed, i.e., for example, the channel information is not transmitted, when at Step S201 each component of the HDMI® sink 72 performs bidirectional communication with the HDMI® source 71 through transmission/reception of the CEC signal to thereafter terminate the communication process.

In this manner, the HDMI® sink 72 performs full duplex communication or half duplex communication in accordance with the received channel information, i.e., in accordance with the function possessed by the communication partner HDMI® source 71.

As described above, high speed bidirectional communication can be performed while retaining compatibility with conventional HDMI® and selecting an optimum communication method, by performing full duplex communication or half duplex communication between the HDMI® sink 72 and HDMI® source 71 and by changing over the switches 135, 185 and 186 to select transmission data and reception data in accordance with the function possessed by the communication partner HDMI® source 71.

Further, high speed bidirectional IP communication by a half duplex communication method or full duplex communication method can be performed while retaining compatibility with a conventional HDMI® cable, by connecting the HDMI® source 71 and HDMI® sink 72 by the HDMI® cable 35 which contains the CEC line 84 and signal line 141 wired as a differential twist pair and shielded and connected to the ground line and the SDA line 191 and SCL line 192 wired as a differential twist pair and shielded and connected to the ground line.

As described above, any one of one or a plurality of data sets is selected as transmission data, the selected data is transmitted to a communication partner via a predetermined signal line, any one of one or a plurality of data sets transmitted from the communication partner is selected as reception data, and the selected data is received. Accordingly, high speed bidirectional IP communication can be performed via the HDMI® cable 35 between the HDMI® source 71 and HDMI® sink 72 while retaining compatibility with HDMI®, i.e., while allowing uncompressed image pixel data to be transmitted unidirectionally at high speed from the HDMI® source 71 to the HDMI® sink 72.

As a result, if a source apparatus, e.g., an electronic apparatus such as the reproducing apparatus 33 shown in FIG. 2, mounting therein the HDMI® source 71, has a server function such as DLNA (Digital living Network Alliance), and a sink apparatus, e.g., an electronic apparatus such as the digital television set 31 shown in FIG. 2, mounting therein the HDMI® sink 72, has a LAN communication interface such as Ethernet (Registered Trademark), it is possible to transmit content from the source apparatus to the sink apparatus via the HDMI® cable and to transmit the content from the source apparatus, from the sink apparatus to another apparatus (e.g., the digital television set 34 shown in FIG. 2) connected to the LAN communication interface of the sink apparatus, by direct bidirectional IP communication or bidirectional IP communication via an electronic apparatus such as the amplifier 32 connected by the HDMI® cable.

Further, with the bidirectional IP communication between the HDMI® source 71 and HDMI® sink 72, control commands and responses can be transferred at high speed between a source apparatus mounting therein the HDMI® source 71 and a sink apparatus mounting therein the HDMI® sink 72 interconnected by the HDMI® cable 35. It is therefore possible to control apparatus by high speed responses.

Next, the above-described series of processes may be realized by dedicated hardware or software. If a series of processes are to be realized by software, the program constituting the software is installed in microcomputers or the like which controls the HDMI® source 71 and HDMI® sink 72.

FIG. 17 shows an example of a structure of a computer installed with the program for executing the above-described series of processes, according to an embodiment.

The program may be recorded in an EEPROM (Electrically Erasable Programmable Read-only Memory) 305 or a ROM 303 as a recording medium mounted in the computer.

Alternatively, the program may be temporarily or perpetually stored (recorded) in a removable recording medium such as a flexible disc, a CD-ROM (Compact Disc Read-Only Memory), a MO (Magneto Optical) disc, a DVD (Digital Versatile Disc), a magnetic disc and a semiconductor memory. This removable recording medium may be presented as so-called package software.

Note that the program may be installed from the removable recording medium as described above into the computer, may be wireless-transferred from a download site to the computer via a digital satellite broadcasting artificial satellite, or may be wired-transferred to the computer via a network such as a LAN and the Internet, and the computer receives the transferred program at an I/O interface 306 and installs the program in a built-in EEPROM 305.

The computer has a built-in CPU (Central Processing Unit) 302. The CPU 302 is connected to the I/O interface 306 via a bus 301, and loads the program stored in a ROM (Read-Only Memory) 303 or an EEPROM 305 in a RAM (Random Access Memory) 304 to execute the program. Accordingly, the CPU 302 executes the processes in the above-described flowcharts and the processes to be performed by the structures shown in the above-described block diagrams.

Further, the computer has a display unit 307 and a speaker 308. The display unit 307 is constituted of, for example, an LCD (Liquid Crystal Display), and displays a video signal generated by the CPU 302. Note that the display unit 307 may be incorporated in the computer, or may be externally connected to the computer. The speaker 308 outputs an audio signal generated by the CPU 302. The speaker 308 may also be incorporated in the computer, or may be externally connected to the computer.

Herein, in this specification, process steps describing the program for making a computer execute various processes are not necessarily required to be executed time sequentially in the order of written statements in the flowcharts, but may contain a process to be executed parallel or independently (e.g., a parallel process or a process by an object).

Further, the program may be executed by one computer or distributively executed by a plurality of computers.

Of course, as the source apparatus and the sink apparatus, not only the computer, but also any electronic apparatuses such as a television apparatus and a recording/reproducing apparatus can be applied. These other apparatuses also have the components similar to those shown in FIG. 17.

It should be noted that the present invention is applicable to a communication interface constituted of a transmission apparatus for unidirectionally transmitting differential signals corresponding to pixel data of an uncompressed image of one screen, to a reception apparatus via a plurality of channels in an effective video period which is a period from one vertical synchronization signal to the next vertical synchronization signal subtracting horizontal blanking periods and a vertical blanking period, and the reception apparatus for receiving the differential signals transmitted from the transmission apparatus via the plurality of channels.

In the embodiment, bidirectional IP communication is performed by controlling when necessary a data selection timing, a differential signal reception timing and a differential signal transmission timing between the HDMI® source 71 and HDMI® sink 72, but bidirectional communication may be performed in accordance with a protocol different from IP.

It should be noted that the embodiment of the present invention is not limited to the above-described embodiment, but various modifications are possible without departing from the features of the present invention.

According to the embodiment described above, bidirectional communication is possible. Specifically, bidirectional communication at high speed can be performed while retaining compatibility, in a communication interface capable of transmitting pixel data of an uncompressed image and audio data accompanied by the pixel data unidirectionally at high speed.

Incidentally, although partially overlapping the already described techniques, many audio/video apparatuses are provided with a LAN communication function for the purposes of viewing bidirectional programs, sophisticated remote control, receiving an electronic program table and the like.

As a means for forming a network among audio/video apparatuses, there are selection candidates such as wiring a dedicated cable such as CAT5, wireless communication, and electric light wire communication.

However, a dedicated cable makes complicate the connection among apparatus, and wireless communication and electric light wire communication have disadvantages that a complicated modulation circuit and a transceiver are expensive.

Therefore, the above-described embodiment discloses the techniques of adding a LAN communication function without adding a new connector electrode to HDMI.

Since HDMI is an interface for performing video data and audio data transmission, replacement and authentication of connected apparatus information, and communication of apparatus control data by using one cable, HDMI has a large advantage that LAN communication can be performed with an added LAN function, without using a dedicated cable and wireless communication or the like.

Incidentally, the techniques disclosed as the above-described embodiment provides that the differential transmission lines used by LAN communication serve as replacement and authentication of connected apparatus information and communication of apparatus control data.

With HDMI, a parasitic capacitance and an impedance of the connected apparatus electric characteristics have severe restrictions not only on DDC performing replacement and authentication of connected apparatus information but also on CEC for communication of apparatus control data.

Specifically, a DDC terminal parasitic capacitance of an apparatus is required to be 50 pF or smaller, and an impedance is required to be grounded to ground GND at 200Ω or smaller when LOW is output and to be pulled up to a power source at about 2 kΩ in HIGH state.

Meanwhile, transmission/reception terminals are required to be terminated at least at about 100Ω in a high frequency band in order to stabilize LAN communication which transmits a high speed signal.

FIG. 19 shows the state that a transmitter 404 and a transmitter 405 for LAN communication are AC-coupled always to DDC lines of an existing HDMI source apparatus 401 and an existing HDMI sink apparatus 402.

In order to satisfy the DDC parasitic capacitance restrictions, it is required that a LAN transmitter/receiver circuit added to the DDC lines has AC coupling via a sufficiently small capacitance. Therefore, a LAN signal is attenuated greatly and has distortion so that the transmitter and receiver capable of compensating this may become complicated and expensive.

Further, transition between HIGH and LOW states during DDC communication may hinder LAN communication. Namely, there is a fear that LAN does not function during DDC communication.

Therefore, in the following, description will be made on a communication system as a more preferred embodiment, which is characterized in that in the interface which performs video data and audio data transmission, replacement and authentication of connected apparatus information, communication of apparatus control data and LAN communication by using basically one cable, the LAN communication is performed by bidirectional communication via a pair of differential transmission lines, and a connection state of the interface is notified by at least one DC bias potential of the transmission lines.

The techniques described hereunder are not necessarily required to have the selection units as in the above-described embodiment.

FIG. 18 is a circuit diagram showing an example of a first structure of the communication system in which a connection state of the interface is notified by at least one DC bias potential of the transmission lines.

FIG. 19 shows an example of the system when used in Ethernet (Registered Trademark).

As shown in FIG. 18, this communication system 400 is constituted of a LAN function expansion HDMI (hereinafter abbreviated to EH) source apparatus 401, an EH sink apparatus 402, an EH cable 403 for interconnecting the EH source apparatus and EH sink apparatus, an Ethernet (Registered Trademark) transmitter 404 and an Ethernet (Registered Trademark) receiver 405.

The EH source apparatus 401 has a LAN signal transmitter circuit 411, a terminating resistor 412, AC coupling capacitors 413 and 414, a LAN signal receiver circuit 415, a subtracting circuit 416, a pull-up resistor 421, a resistor 422 and a capacitor 423 forming a low-pulse filter, a comparator 424, a pull-down resistor 431, a resistor 432 and a capacitor 433 forming a low-pass filter, and a comparator 434.

The EH sink apparatus 402 has a LAN signal transmitter circuit 441, a terminating resistor 442, AC coupling capacitors 443 and 444, a LAN signal receiver circuit 445, a subtracting circuit 446, a pull-down resistor 451, a resistor 452 and a capacitor 453 forming a low-pulse filter, a comparator 454, a choke coil 461, and resistors 462 and 463 serially connected between a power source potential and a reference potential.

The EH cable 403 has differential transmission lines constituted of a reserved line 501 and an HPD Line 502 which are provided with a source side terminal 511 of the reserved line 501, a source side terminal 512 of the HPD Line 502, a sink side terminal 521 of the reserved line 501 and a sink side terminal 522 of the HPD line. The reserved line 501 and HPD line 502 are wired as a differential twist pair.

In the communication system 400 constructed as above, the terminals 511 and 512 are connected in the source apparatus 401, via the AC coupling capacitors 413 and 414 to the terminating resistor 412, LAN signal transmitter circuit 411 and LAN signal receiver circuit 415.

The subtracting circuit 416 receives a sum signal SG412 of a transmission signal voltage generated by current output from the LAN signal transmitter circuit 411 by a load of the terminating resistor 412 and transmission lines 501 and 502 and a reception signal voltage of a signal transmitted from the EH sink apparatus 402.

In the subtracting circuit 416, a signal SG413 obtained by subtracting the transmission signal SG411 from the sum signal SG412 is a net signal transmitted from the sink.

The sink apparatus 402 has a similar circuit network. With these circuit networks, the source apparatus 401 and sink apparatus 402 perform bidirectional LAN communication.

In addition to the above-described LAN communication, the HPD line 502 notifies the source apparatus 401 of that the cable 403 is connected to the sink apparatus 402, by using a DC bias level.

The resistors 462 and 463 and choke coil 461 of the sink apparatus 402 bias the HPD line 502 to about 4V via the terminal 522 when the cable 403 is connected to the sink apparatus 402.

The source apparatus 401 extracts a DC bias at the HPD line 502 by the low-pass filter made of the resistor 432 and capacitor 433, and the comparator 434 compares the DC bias with the reference potential Vref2 (e.g, 1.4 V).

If the cable 403 is not connected to the source apparatus 402, a potential at the terminal 512 is lower than the reference potential Vref2 because of the pull-down resistor 431, whereas if connected, the potential is higher then the reference potential.

Therefore, if an output signal SG415 of the comparator 434 is HIGH, it means that the cable 403 is connected to the sink apparatus 402.

If the output signal SG415 of the comparator 434 is LOW, it means that the cable 403 is not connected to the sink apparatus 402.

The example of the first structure further has a function of mutually recognizing from a DC bias potential at the reserved line 501 whether the apparatus connected at opposite ends of the cable 403 are EH compatible apparatus or HDMI apparatus not compatible with EH.

The EH source apparatus 401 pulls up (+5 V) the reserved line 501 by the resistor 421, and the EH sink apparatus 402 pulls down the reserved line by the resistor 451.

These resistors 421 and 451 do not exist in the apparatus not compatible with EH.

The EH source apparatus 401 compares by the comparator 424 a DC potential at the reserved line 501 passed through the low-pass filter made of the resistor 422 and capacitor 423 with the reference voltage Vref1.

If the sink apparatus 402 is compatible with EH and has a pull-down function, the potential at the reserved line 501 is 2.5 V, and if the sink apparatus is not compatible with EH and has no pull-down function, the potential at the reserved line is 5 V. Therefore, if the reference potential Vref1 is 3.75 V, it is possible to distinguish between a compatible sink apparatus and an incompatible sink apparatus.

The sink apparatus 402 compares by the comparator 454 a DC potential at the reserved line 501 passed through the low-pass filter made of the resistor 452 and capacitor 453 with the reference voltage Vref3.

If the source apparatus 402 is compatible with EH and has a pull-up function, the potential is 2.5 V, and if the source apparatus is not compatible with EH, the potential is 0 V. Therefore, if the reference potential is 1.25 V, it is possible to distinguish between an EH compatible source apparatus and an EH incompatible source apparatus.

As described above, according to the example of the first structure, in the interface which performs video data and audio data transmission, replacement and authentication of connected apparatus information, communication of apparatus control data and LAN communication by using one cable 403, the LAN communication is performed by bidirectional communication via a pair of differential transmission lines, and a connection state of the interface is notified by at least one DC bias potential of the transmission lines. It is therefore possible to physical and spatial separation of the SCL line and SDA line such that they are not used for LAN communication.

As a result, this division allows a LAN communication circuit to be formed independently from the electric specifications stipulated for DDC, and stable and reliable LAN communication can be realized at low cost.

It should be noted that the pull-up resistor 421 shown in FIG. 18 may be provided not in the EH source apparatus 401, but in the EH cable 403. In such case, terminals of the pull-up resistor 421 are connected to the reserved line 501 and a line (signal line) connected to a power source (power source potential), respectively, out of the lines provided within the EH cable 403.

Further, the pull-down resistor 451 and the resistor 463 may be provided not in the EH sink apparatus 402, but in the EH cable 403. In such case, terminals of the pull-down resistor 451 are connected to the reserved line 501 and a line (ground line) connected to a ground (reference potential), respectively, out of the lines provided within the EH cable 403. In addition, terminals of the resistor 463 are connected to the HPD line 502 and the line (ground line) connected the ground (reference potential), respectively, out of the lines provided within the EH cable 403.

FIG. 20 is a circuit diagram showing an example of a second structure of the communication system in which a connection state of the interface is notified by at least one DC bias potential of the transmission lines.

Fundamentally similar to the example of the first structure, this communication system 600 is characterized in a structure that in the interface which performs video data and audio data transmission, replacement and authentication of connected apparatus information, communication of apparatus control data and LAN communication by using one cable, the LAN communication is performed by unidirectional communication via two pairs of differential transmission lines, and a connection state of the interface is notified by at least one DC bias potential of the transmission lines, and that at least two transmission lines are used for communication of replacement and authentication of connected apparatus information, time divisionally with LAN communication.

As shown in FIG. 20, this communication system 600 is constituted of a LAN function expansion HDMI (hereinafter abbreviated to EH) source apparatus 601, an EH sink apparatus 602 and an EH cable 603 for interconnecting the EH source apparatus and EH sink apparatus.

The EH source apparatus 601 has a LAN signal transmitter circuit 611, terminating resistor 612 and 613, AC coupling capacitors 614 to 617, a LAN signal receiver circuit 618, an inverter 620, a resistor 621, a resistor 622 and a capacitor 623 forming a low-pulse filter, a comparator 624, a pull-down resistor 631, a resistor 632 and a capacitor 633 forming a low-pass filter, a comparator 634, a NOR gate 640, analog switches 641 to 644, an inverter 635, analog switches 646 and 747, DDC transceivers 651 and 652 and pull-up resistors 653 and 654.

The EH sink apparatus 602 has a LAN signal transmitter circuit 661, terminating resistors 662 and 663, AC coupling capacitors 664 to 667, a LAN signal receiver circuit 668, a pull-down resistor 671, a resistor 672 and a capacitor 673 forming a low-pulse filter, a comparator 674, a choke coil 681, resistors 682 and 683 serially connected between a power source potential and a reference potential, analog switches 691 to 694, inverter 695, analog switches 696 and 697, DDC transceivers 701 and 702, and a pull-up resistor 703.

The EH cable 603 has differential transmission lines constituted of a reserved line 801 and an SCL line 803 and differential transmission lines constituted of an SDA line 804 and an HPD line 802, which are provided with source side terminal 811 to 814 and sink side terminals 821 to 824.

The reserved line 801 and SCL line 803 and the SDA line 804 and HPD line 802 are wired as differential twist pairs.

In the communication system 600 constructed as above, the terminals 811 and 813 are connected in the source apparatus 601 via the AC coupling capacitors 614 and 615 and the analog switches 641 and 642, to the transmitter circuit 611 for transmitting a LAN transmission signal SG611 to the sink, and to the terminating resistor 612.

The terminals 814 and 812 are connected via the AC coupling capacitors 616 and 617 and the analog switches 643 and 644, to the receiver circuit 618 for receiving a LAN signal from the sink apparatus 602, and to the terminating resistor 613.

In the sink apparatus 602, the terminals 821 to 824 are connected via the AC coupling capacitors 664, 665, 666 and 667 and analog switches 691 to 694 to the transmitter and receiver circuits 668 and 661 and terminating resistors 662 and 663.

The analog switches 641 to 644 and 691 to 694 turn on when LAN communication is performed and turn off when DDC communication is performed.

The source apparatus 601 connects the terminals 813 and 814 to the DDC transceivers 651 and 652 and pull-up resistors 653 and 654 via other analog switches 646 and 647.

The sink apparatus 602 connects the terminals 823 and 824 to the DDC transceivers 701 and 702 and pull-up resistor 703 via the analog switches 696 and 697.

The analog switches 646, 647, 696 and 697 turn on when DDC communication is performed and turn off when DLAN communication is performed.

The recognition mechanism of an EH compatible apparatus by a potential at the reserved line 801 is basically the same as that of the example of the first structure, except that the resistor 62 of the source apparatus 601 is driven by the inverter 620.

When an input to the inverter 620 is HIGH, the resistor 621 is used as a pull-down resistor providing a 0V state which is the same state as an EH compatible apparatus is connected as viewed from the sink apparatus 602.

As a result, a signal SG623 indicating an EH compatibility identification result of the sink apparatus 602 becomes LOW so that the analog switches 691 to 694 controlled by the signal SG623 turn off and the analog switches 696 and 697 controlled by a signal obtained by inverting the signal SG623 at the inverter 695 turn on.

As a result, the sink apparatus 602 enters the DDC transceiver connected state by disconnecting the SCL line 803 and SDA line 804 from the LAN transceiver.

Meanwhile, in the source apparatus 601, an input to the inverter 620 is also input to the NOR gate 640 whose output SG614 becomes LOW.

The analog switches 641 to 6444 controlled by the output signal SF614 of the NOR gate 640 turn off, and the analog switches 646 and 647 controlled by a signal obtained by inverting the signal SF614 at the inverter 645 turn on.

As a result, the source apparatus 601 also enters the DDC transceiver connected state by disconnecting the SCL line 803 and SDA line 804 from the LAN transceiver.

Conversely, when an input to the inverter 620 is LOW, both the source apparatus 601 and sink apparatus 602 enter the LAN transceiver connected state by disconnecting the SCL line 803 and SDA line 804 from the DDC transceiver.

The circuits 631 to 634 and 681 to 683 for the connection confirmation by a DC bias potential at the HPD line 802 have the function similar to that of the example of the first structure.

Namely, the HPD Line 802 is used for the above-described LAN communication, and in addition notifies the source apparatus 601 of that the cable 803 is connected to the sink apparatus 602, by using the DC bias level.

The resistors 682 and 683 and choke coil 681 within the sink apparatus 602 bias the HPD line 802 via the terminal 822 to about 4 V, when the cable 603 is connected to the sink apparatus 602.

The source apparatus 601 extracts a DC bias at the HPD line 802 by the low-pass filter made of the resistor 632 and capacitor 633, and compares by the comparator 634 the DC bias with the reference potential Vref2 (e.g., 1.4 V).

If the cable 603 is connected to the source apparatus 602, a potential at the terminal 812 is lower than the reference potential Vref2 because of the pull-down resistor 631, whereas if connected, the potential is higher then the reference potential.

Therefore, if an output signal SG613 of the comparator 634 is HIGH, it means that the cable 803 is connected to the sink apparatus 602.

Whereas, if the output signal SG613 of the comparator 634 is LOW, it means that the cable 603 is not connected to the sink apparatus 602.

As described above, according to the example of the second structure, in the interface which performs video data and audio data transmission, replacement and authentication of connected apparatus information, communication of apparatus control data and LAN communication by using one cable, the LAN communication is performed by unidirectional communication via two pairs of differential transmission lines, and a connection state of the interface is notified by at least one DC bias potential of the transmission lines, and further at least two transmission lines are used for communication of replacement and authentication of connected apparatus information, time divisionally with LAN communication. This division allows a LAN communication circuit to be formed independently from the electric specifications stipulated for DDC, and stable and reliable LAN communication can be realized at low cost.

It should be noted that the resistor 621 shown in FIG. 20 may be provided not in the EH source apparatus 601, but in the EH cable 603. In such case, terminals of the resistor 621 are connected to the reserved line 801 and a line (signal line) connected to a power source (power source potential), respectively, out of the lines provided within the EH cable 603.

Further, the pull-down resistor 671 and the resistor 683 may be provided not in the EH sink apparatus 602, but in the EH cable 603. In such case, terminals of the pull-down resistor 671 are connected to the reserved line 801 and a line (ground line) connected to a ground (reference potential), respectively, out of the lines provided within the EH cable 603. In addition, terminals of the resistor 683 are connected to the HPD line 802 and the line (ground line) connected the ground (reference potential), respectively, out of the lines provided within the EH cable 603.

As described so far, in the embodiment related to FIGS. 2 to 17, of nineteen HDMI pins, SDA and SCL are used as a first differential pair, and CEC and Reserved are used as a second pair to perform unidirectional communication at each pair and realize full duplex communication.

However, with SDA and SCL, communication is performed at 1.5 KΩ pull-up for HIGH and at a low impedance for LOW, whereas also with CEC, communication is performed at 27 KΩ pull-up for HIGH and at a low impedance for LOW.

Retaining these functions in order to have compatibility with existing HDMI may lead to a fear that it becomes difficult to share the functions of high speed data communication LAN which is required to have impedance matching at terminating ends of a transmission line.

Therefore, in the example of the first structure, full duplex communication is realized by one-pair bidirectional communication using a differential pair of Reserved and HPD to avoid the use of SDA, SCL and CEC lines.

Since HPD is a flag signal at a DC level, injection of a LAN signal by AC coupling and transmission of plug information at a DC level are both satisfied. Reserved is provided with a new function of mutually recognizing a terminal having a LAN function by using a DC level and a method similar to HPD.

In the example of the second structure, two-pair full duplex communication is realized by unidirectional communication at each of two differential pairs of HPD and SDA, and SCL and Reserved.

Timings of burst-like DDC communication by SDA and SCL of HDMI are controlled in a state that the transmitter is always a master.

In this example, the analog switches are operated such that when a transmitter performs DDC communication, SDA and SCL lines are connected to the DDC transceiver, and when a transmitter does not perform DDC communication, the lines are connected to the LAN transceiver.

These switch control signals are also transmitted to a receiver at a DC level of the Reserved line, and switches are changed over also on the receiver side.

Adopting these structures provides a first advantage that SCL, SDA and CEC communication will not influenced by noises of LAN communication and stable DDC and CEC communication can be established always.

This is because in the example of the first structure, LAN is separated physically from lines and in the example of the second structure, LAN signal is disconnected from lines by switches during DDC communication.

A second advantage is that stable communication having a large margin can be realized because LAN communication is performed by using lines having ideal terminations.

This is because in the example of the first structure, the terminating impedance can be maintained at an ideal value in a sufficiently broad frequency band necessary for LAN communication in which a LAN signal is superposed upon Reserved and HPD lines which transmits a signal only at a DC level, and in the example of the second structure, LAN terminating circuits not permitted for DDC communication are connected by switches only during LAN communication.

FIGS. 21A to 21E are diagrams showing the bidirectional communication waveforms on the communication system of the examples of the structures.

FIG. 21A shows signal waveforms sent from an EH sink apparatus, FIG. 21B shows signal waveforms receives at the EH sink apparatus, FIG. 21C shows signal waveforms passing in the cable, FIG. 21D shows signals received at an EH source apparatus, and FIG. 21E shows signal waveforms sent from the EH source apparatus.

As shown in FIG. 21, good bidirectional communication can be realized by using the examples of the structures.

(Cable Discrimination)

Next, a description will be made on an embodiment for discriminating whether an inserted cable is an HDMI cable used for a communication system in conformity with the LAN function expanded HDMI (hereinafter, new HDMI cable) or an HDMI cable in conformity with a conventional HDMI standard (hereinafter, conventional HDMI cable).

(First Embodiment)

First, a description is made on a first embodiment for cable discrimination.

FIG. 22 are diagrams showing circuit configurations of a sink apparatus and a source apparatus in this embodiment. In the figure, a state where the new HDMI cable and the conventional HDMI cable are respectively inserted between a source apparatus 401 in conformity with the expanded HDMI (hereinafter, expanded HDMI source apparatus 401) and a sink apparatus 402 (expanded HDMI sink apparatus 402). FIG. 22(A) shows a state where the new HDMI cable is inserted. FIG. 22(B) shows a state where the conventional HDMI cable is inserted.

As shown in the figures, the expanded HDMI source apparatus 401 and the expanded HDMI sink apparatus 402 have connectors 941 and 942, respectively, for connecting with the new HDMI cable 901 or the conventional HDMI cable 931.

Capacitors 905 (C1A) and 907 (C1B) are provided on an HPD signal line 902 of the expanded HDMI sink apparatus 402 and the expanded source apparatus 401, respectively, and capacitors 906 (C2A) and 908 (C2B) are provided on a reserved line 903 of the expanded HDMI sink apparatus 402 and the expanded HDMI source apparatus 401, respectively. With these four capacitors, the HPD signal line 902 and the reserved line 903 are subjected to DC cutting, and thus it becomes possible to transmit high frequency signals, e.g., 100 Mbps as a differential signal without phase distortion, as described with reference to FIG. 18, etc.

In an expanded HDMI sink apparatus 402 side circuit, the HPD signal line 902 has a pull-up resistor 911 (R1A) of 1 kΩ between the HPD signal line 902 and a voltage supply Vcc, and a pull-down resistor 913 (R1B) between the HPD signal line 902 and a ground.

Similarly, the reserved line 903 has, in the expanded HDMI sink apparatus 402 side circuit, a pull-down resistor 914 (R2B) between the reserved line 903 and a ground, and in the new HDMI cable 901, a pull-up resistor 912 (R2A) between the reserved line 903 and a voltage supply Vcc of the expanded HDMI source apparatus 401. In the new HDMI cable 901, the pull-up resistor 912 is connected via, for example, a small substrate. These four resistors 911 to 914 form a termination circuit.

This embodiment shows an example of cable discrimination that is performed on the expanded HDMI sink apparatus 402 side, in which a voltage at a test point 19 (TP_sink) on the reserved line 903 on the expanded HDMI sink apparatus 402 side and a reference voltage Vref are compared by a voltage comparator 916 (IC1) to perform discrimination.

Because the pull-down resistor 913 sets a voltage of an HPD signal within a voltage range that can be determined as High level (in this example, around +4 V), the pull-down resistor 913 has a resistance value determined by the following expression (4 kΩ).

$$Vcc*R1B/(R1A+R1B)=4[\text{volt}] \text{ where, } Vcc=5V.$$

If the above expression is modified as R1B=4/(Vcc−4)*R1A, then R1B=4 [kΩ].

Because a voltage of the reserved line 903 is set to substantially the same voltage as that of the HPD signal line 902, the resistance value R2B of the pull-down resistor 914 is the same as the resistance value R1B of the pull-down resistor 913 (4 kΩ).

By setting a circuit constant as described above, the TP_sink voltage at the test point 919 becomes +4 V (FIG. 22(A)) when the new HDMI cable 901 is inserted, and becomes 0 V (FIG. 23(B)) when the conventional HDMI cable 931 is inserted. Therefore, when the voltage comparator 916 compares the reference voltage Vref with the TP_sink voltage, assuming that the reference voltage Vref is an intermediate value between +4 V and 0 V (+2 V), an output of the voltage comparator 916 is as follows.

If TP_sink>Vref, Vo=High
If TP_sink<Vref, Vo=Low

If the output Vo is High, a CPU of the expanded HDMI sink apparatus 402 determines a normal state where the new HDMI cable 901 is inserted. On the contrary, if the output Vo is Low, the CPU determines an abnormal state where the conventional HDMI cable 931 is erroneously inserted by a user.

In this embodiment, because it is possible to design a wide comparative margin (0 V vs 4 V) in the comparison in the voltage comparator 916, an error in cable discrimination can be avoided as much as possible.

In order to notify the user of the discrimination result, it is possible to display an attention message of "an incorrect cable is inserted", etc. on a screen of the expanded HDMI source apparatus 401 (e.g., a television apparatus) by additional hardware or software that uses the CPU. In this case, a video signal including the attention message is generated from the CPU 302, and displayed on the display unit 307 as shown in FIG. 17.

It should be noted that, instead of displaying the attention message, the CPU 302 may output similar content from the speaker 308 as an audio message. Further, the CPU 302 may notify an erroneous insertion of a cable not by the audio message, but by some warning sound or the like.

(Second Embodiment)

Next, a description is made on a second embodiment for cable discrimination. In this embodiment, parts having similar structures or functions to those in the first embodiment are represented by the same symbols, and description thereof is omitted or simplified.

FIG. 24 are diagrams showing circuit configurations of a sink apparatus and a source apparatus in this embodiment. Similar to the first embodiment 1, FIG. 23(A) shows a state where the new HDMI cable 901 is inserted, and FIG. 23(B) shows a state where the conventional HDMI cable 931 is inserted.

This embodiment is an example in which the arrangement of the pull-up resistor 912 and the pull-down resistors 913, 914 in the first embodiment is changed. That is, the pull-up resistor 912 is provided on the expanded HDMI sink apparatus 402 side, and the pull-down resistors 913, 914 are provided within the new HDMI cable 901.

The TP_sink voltage at the test point 919 in this embodiment is +4 V when the new HDMI cable 901 is inserted, whereas +5 V when the conventional HDMI cable 931 is inserted. Therefore, the reference voltage Vref is set to +4.5 V as an intermediate value thereof.

With the structure described above, the output voltage Vo of the voltage comparator 916 in this embodiment is as follows.

If TP_sink>Vref, Vo=High
If TP_sink<Vref, Vo=Low

In this embodiment, contrary to the first embodiment, the CPU of the expanded HDMI sink apparatus 402 determines, when the output Vo is Low, a normal state where the new HDMI cable 901 is inserted, on the other hand, when the output Vo is High, determines a state where the conventional HDMI cable 931 is erroneously inserted.

In this embodiment, it is possible to design a symmetrical differential circuit having the respective resistors 911 to 914. In other words, the respective resistors 911 to 914 are aligned by making the lengths of the signal lines in the differential circuit equal. Accordingly, it becomes possible to transmit high frequency signals without phase distortion.

(Third Embodiment)

Next, a description is made on a third embodiment for cable discrimination. In this embodiment, parts having similar structures or functions to those in the first and second embodiments are represented by the same symbols, and description thereof is omitted or simplified.

FIG. 24 are diagrams showing circuit configurations of a sink apparatus and a source apparatus in this embodiment. Similar to the first and second embodiments, FIG. 24(A) shows a state where the new HDMI cable 901 is inserted, and FIG. 24(B) shows a state where the conventional HDMI cable 931 is inserted.

In this embodiment, different from the first and second embodiments, a resistor 915 (R3) is provided between the HPD signal line 902 and the reserved line 903 within the new HDMI cable 901. The pull-up resistors 911, 912 and the pull-down resistors 913, 914 are arranged on the expanded HDMI sink apparatus 402 side.

Further, in this embodiment, an open-collector type transistor 917 (Q1) that controls the HPD signal line 902 is connected to the HPD signal line 902 in the expanded HDMI sink apparatus 402 side circuit. Cable discrimination is carried out by judging each TP-sink voltage at the test point 919 in ON/OFF states of the open-collector type transistor 917. When a cable is inserted between the expanded HDMI source apparatus 401 and the expanded sink apparatus 402 and +5 V of the cable is detected on the expanded HDMI sink apparatus 402 side, the voltage level of the HPD signal line 902 becomes High level (in this example, +4 V) by the CPU that switches a base input of the transistor 917 (xHPD signal) from High to Low to turn the transistor 917 OFF.

When the new HDMI cable 901 is used, the voltage TP_sink of the reserved line 903 at the test point 919 is the following two patterns.

+4 V This is a voltage divided by R2A and R2B when Q1 is OFF.

+2.2 V This is a voltage divided by R2A and (a parallel resistance value of R2B and R3) when Q1 is ON.

On the other hand, when the conventional HDMI cable 931 is used, the voltage TP_sink of the reserved line 903 at the test point 919 is as follows.

+4 V in both cases where Q1 is ON/OFF

Therefore, if the reference voltage Vref is set to +3.1 V as an intermediate value between +4 V and +2.2 V, the output voltage V0 of the voltage comparator 916 is as follows.

If TP_sink>Vref, Vo=High
If TP_sink<Vref, Vo=Low

That is, when the new HDMI cable 901 is inserted,
Vo=High when Q1 is OFF (xHPD is Low)
Vo=Low when Q1 is ON (xHPD is High),
and when the conventional HDMI cable 931 is inserted,
Vo=High always, regardless of whether Q1 is ON/OFF.

Therefore, in this embodiment, the normal state where the new HDMI cable 901 is inserted is assumed as a state where Vo becomes High when the transistor 917 (Q1) is OFF and Vo becomes Low when the transistor 917 (Q1) is ON. On the other hand, if the output Vo is always High regardless of whether the transistor 917 Q1 is turned ON/OFF, the state where the conventional HDMI cable 931 is erroneously inserted is determined.

Also in this embodiment, it is possible to design a symmetrical differential circuit (termination circuit) having the respective resistors 911 to 914, and thus it becomes possible to transmit high frequency signals without phase distortion.

(Others)

It should be noted that, in the first to third embodiments, the configurations each having two pull-down resistors and two pull-up resistors are shown, but a configuration in which a plurality of resistors that generate a combined resistance value equal to a value constituted of a single resistance value are arranged is of course possible.

Further, it is also possible to judge the voltage of the reserved line 903 not only on the expanded HDMI sink apparatus 402 side, but also on the expanded HDMI source apparatus 401 side. In this case, only the voltage comparator 916 out of the respective component may be provided on the expanded HDMI source apparatus 401 side, or the whole termination circuit including the respective resistors 911 to 914 may be provided on the expanded EDMI source apparatus 401 side.

In addition, in each of the embodiments, cable discrimination is performed by providing the respective resistors and the voltage comparator on the differential twist pair signal line of the HPD line 902 and the reserved signal line 903. However, especially the second embodiment can be applied to the differential twist pair signal line of the SDA line 191 and the SCL line 192 as shown in FIG. 7, the differential twist pair signal line of the reserved line 801 and the SCL line 803, and the differential twist pair signal line of the SDA signal line 804 and the HPD line 802 as shown in FIG. 20. In this case, the configuration of the pull-up resistors and the pull-down resistors may be changed as appropriate.

In the third embodiment, the open-collector type transistor 917 (Q1) for controlling the HPD signal line 902 is provided on the HPD line 902, but, instead, a open-drain type FET (Field Effect Transistor) may of course be provided.

BRIEF DESCRIPTION OF DRAWINGS

[FIG. 3] A diagram showing an example of a structure of an HDMI® source and an HDMI® sink.

[FIG. 4] A diagram showing an assignment of pins of a connector of Type-A of HDMI®.

[FIG. 5] A diagram showing an assignment of pins of a connector of Type-C of HDMI®.

[FIG. 9] A diagram showing a data structure of Vender Specific.

[FIG. 14] A diagram showing a more detailed example of another structure of the HDMI® source and the HDMI® sink.

Description of Reference Numerals

Figure 1:
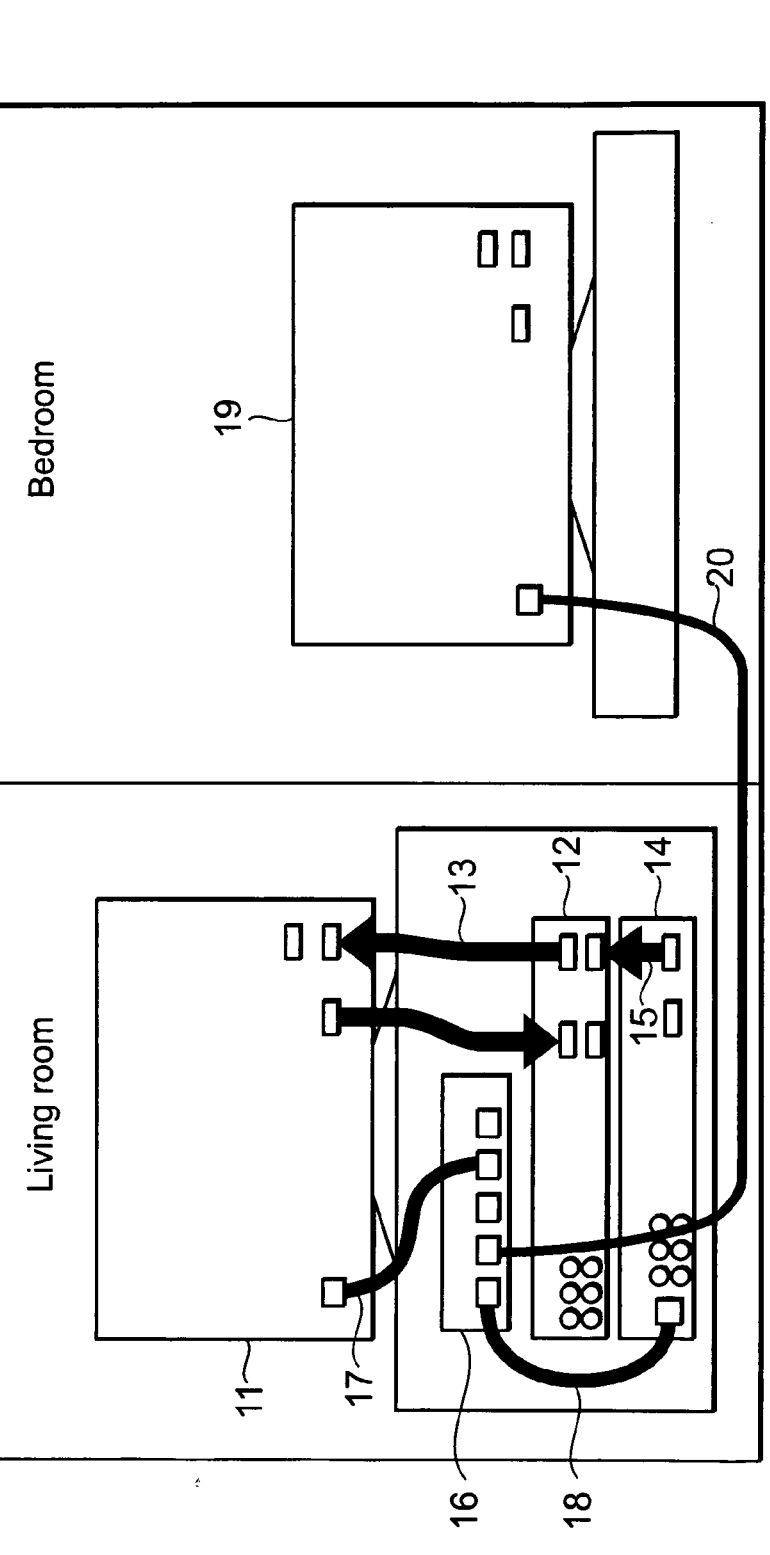
[FIG. 1] A diagram showing a structure of a typical image transmission system.
Figure 2:
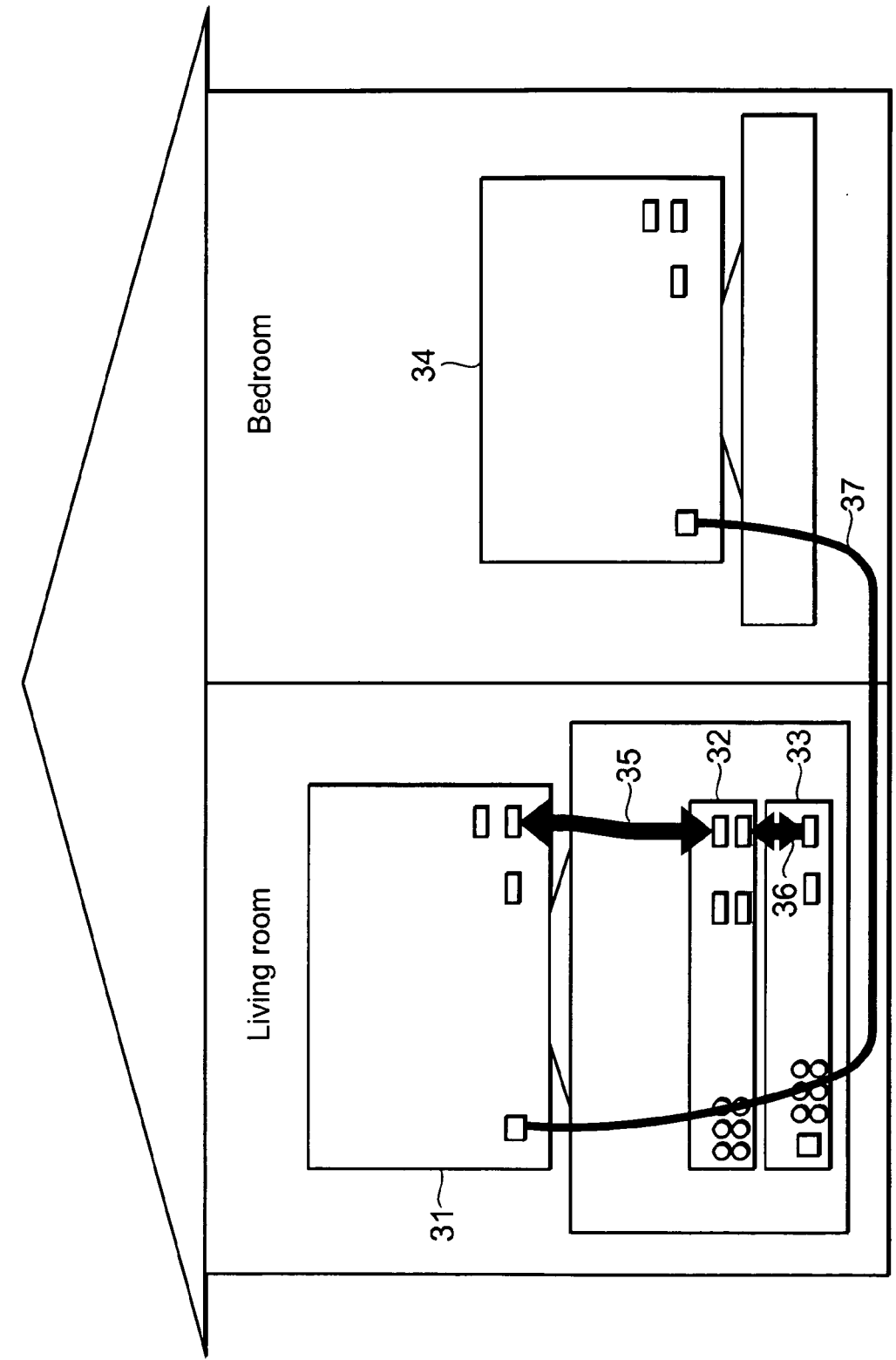
[FIG. 2] A diagram showing a structure of an image transmission system according to an embodiment to which the present invention is applied.
Figure 6:
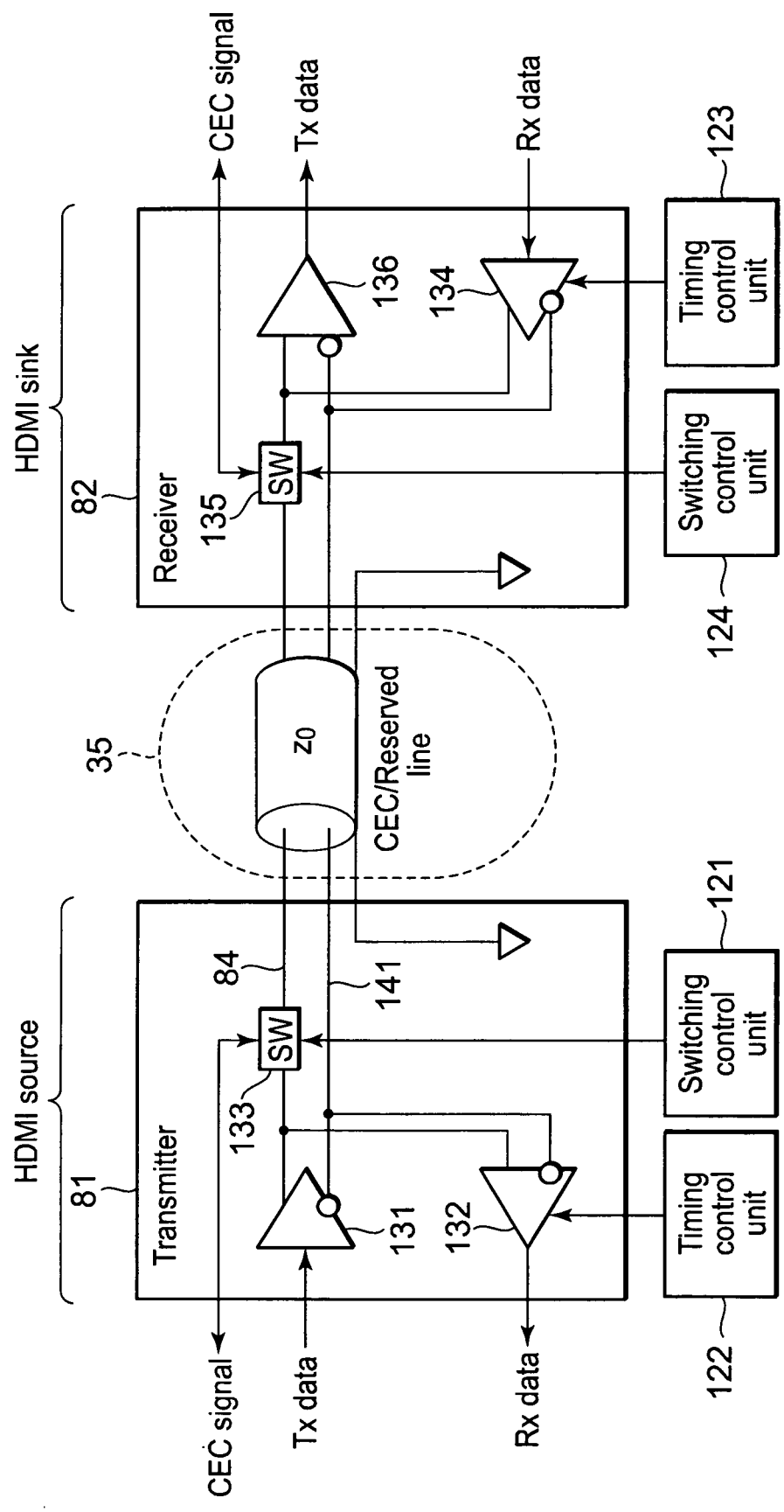
[FIG. 6] A diagram showing a more detailed example of the structure of the HDMI® source and the HDMI® sink.
Figure 7:
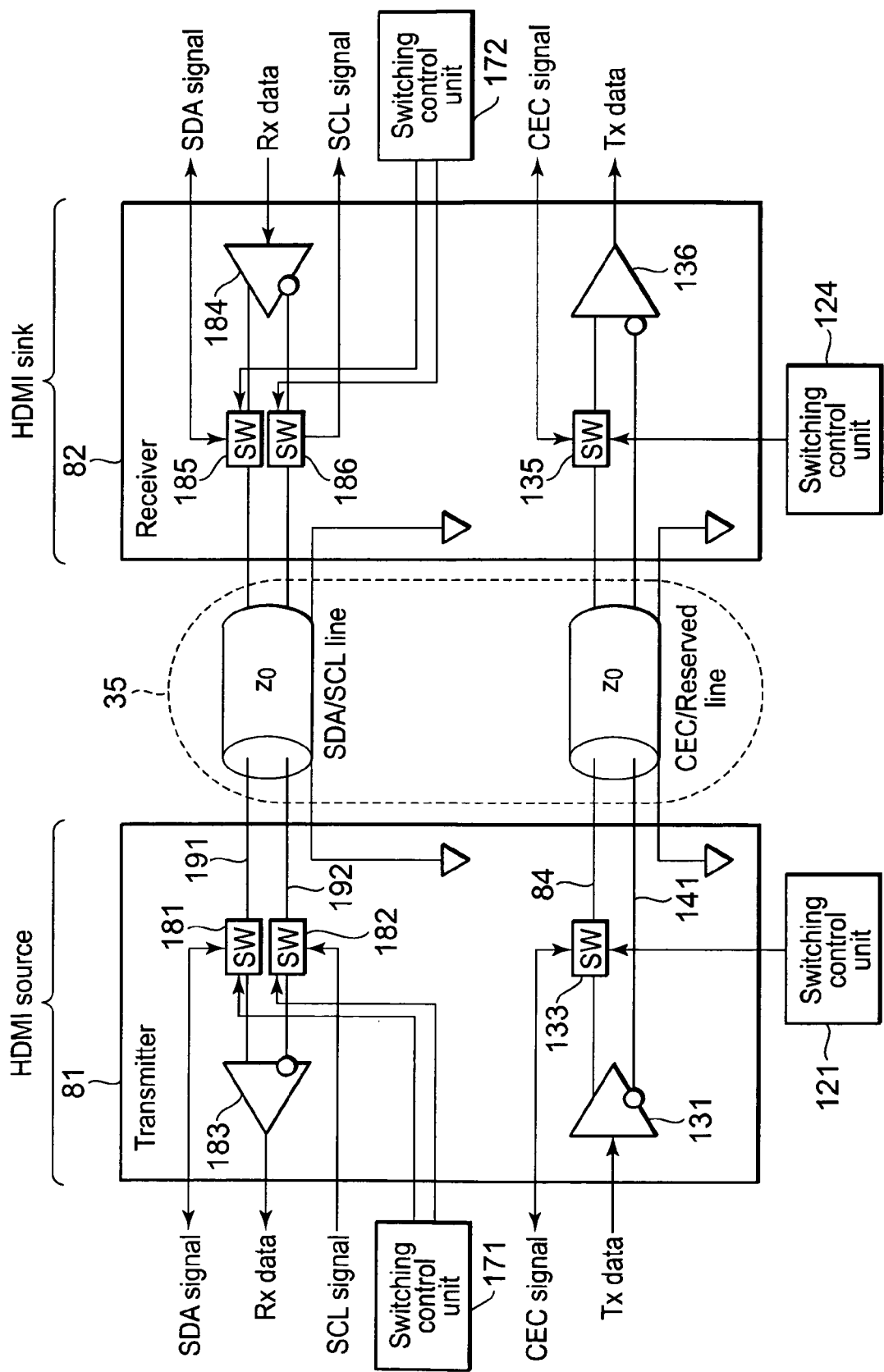
[FIG. 7] A diagram showing a more detailed example of another structure of the HDMI® source and the HDMI® sink.
Figure 8:
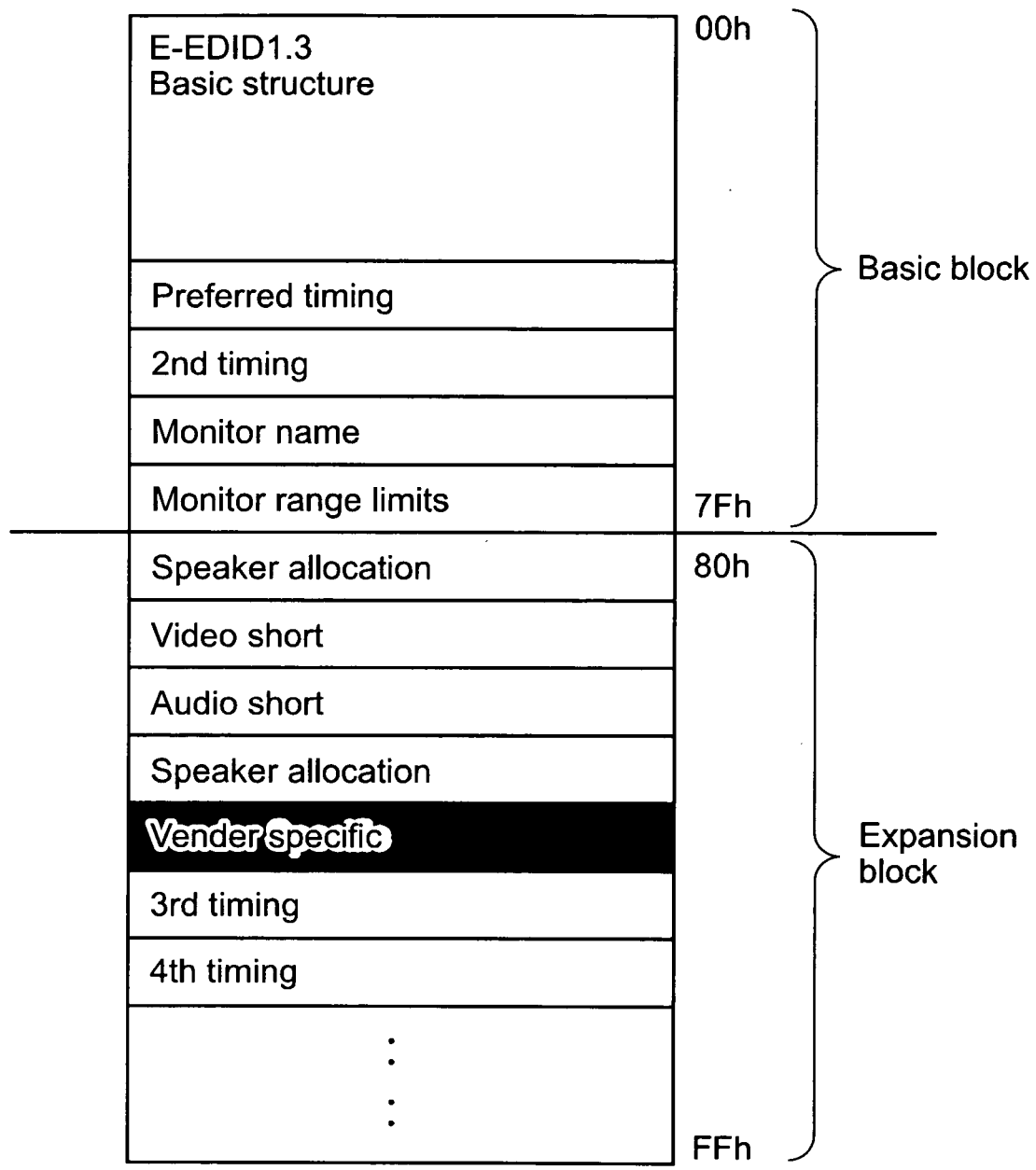
[FIG. 8] A diagram showing a data structure of E-EDID.
Figure 10:
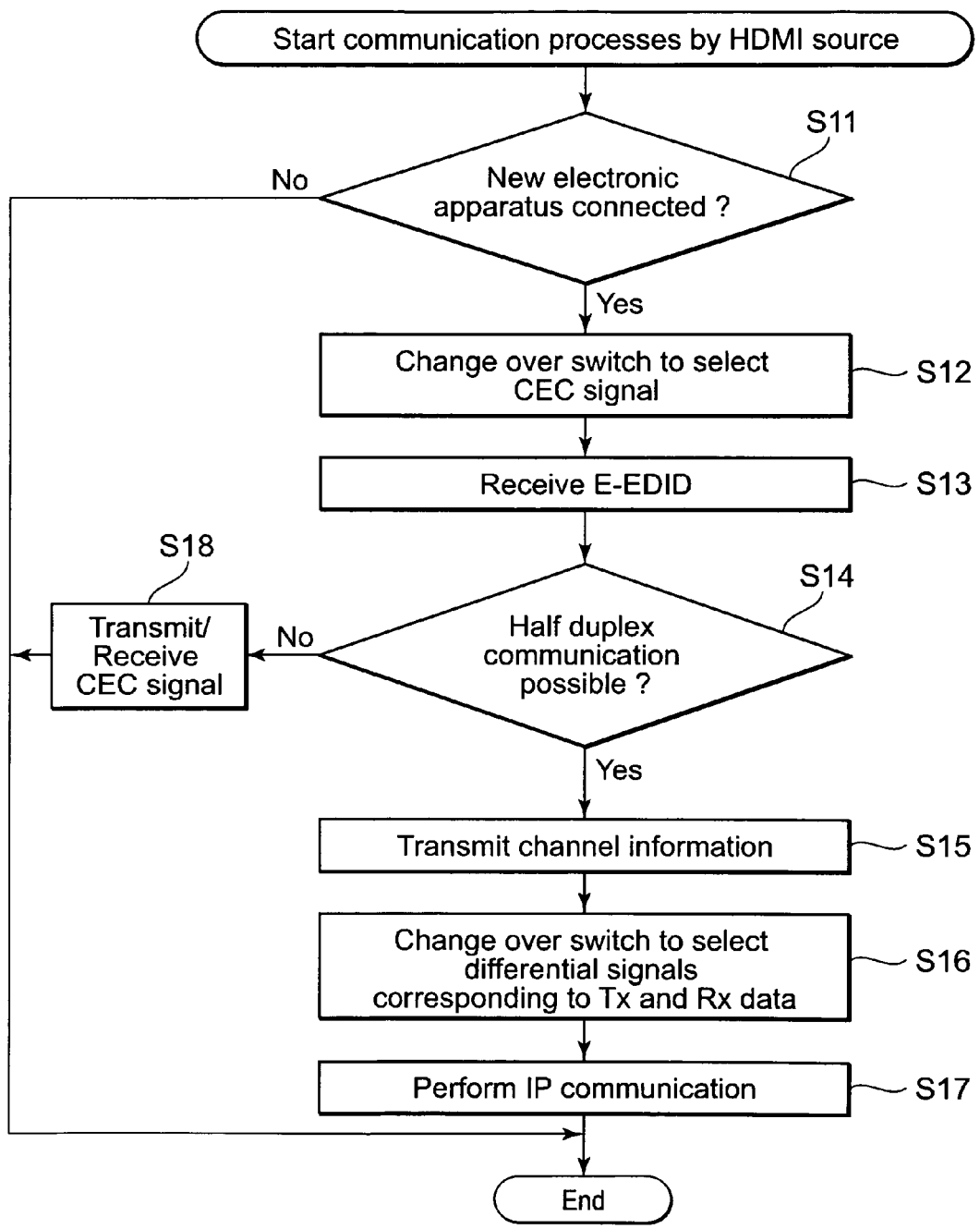
[FIG. 10] A flowchart illustrating a communication process by the HDMI® source.
Figure 11:
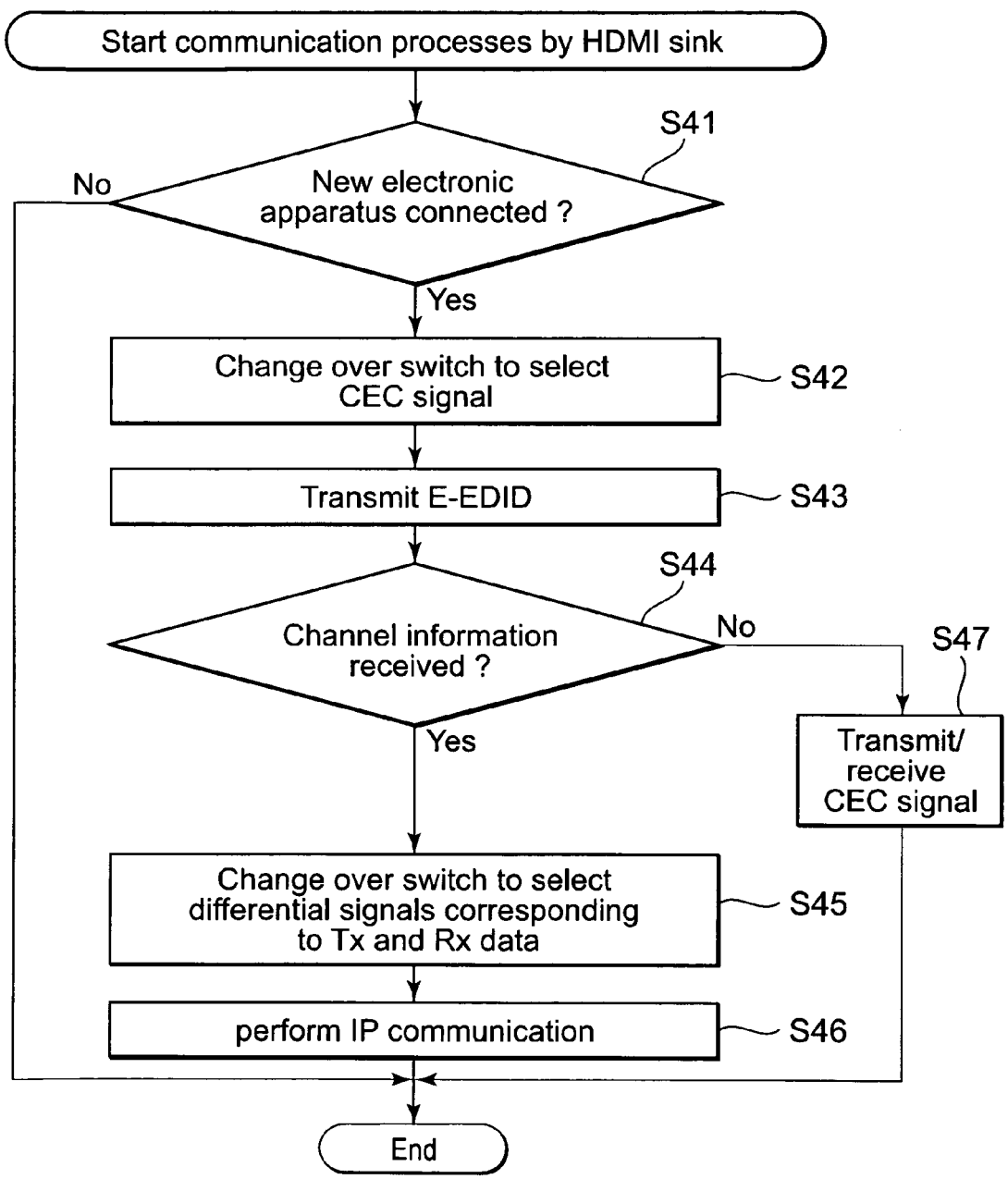
[FIG. 11] A flowchart illustrating a communication process by the HDMI® sink.
Figure 12:
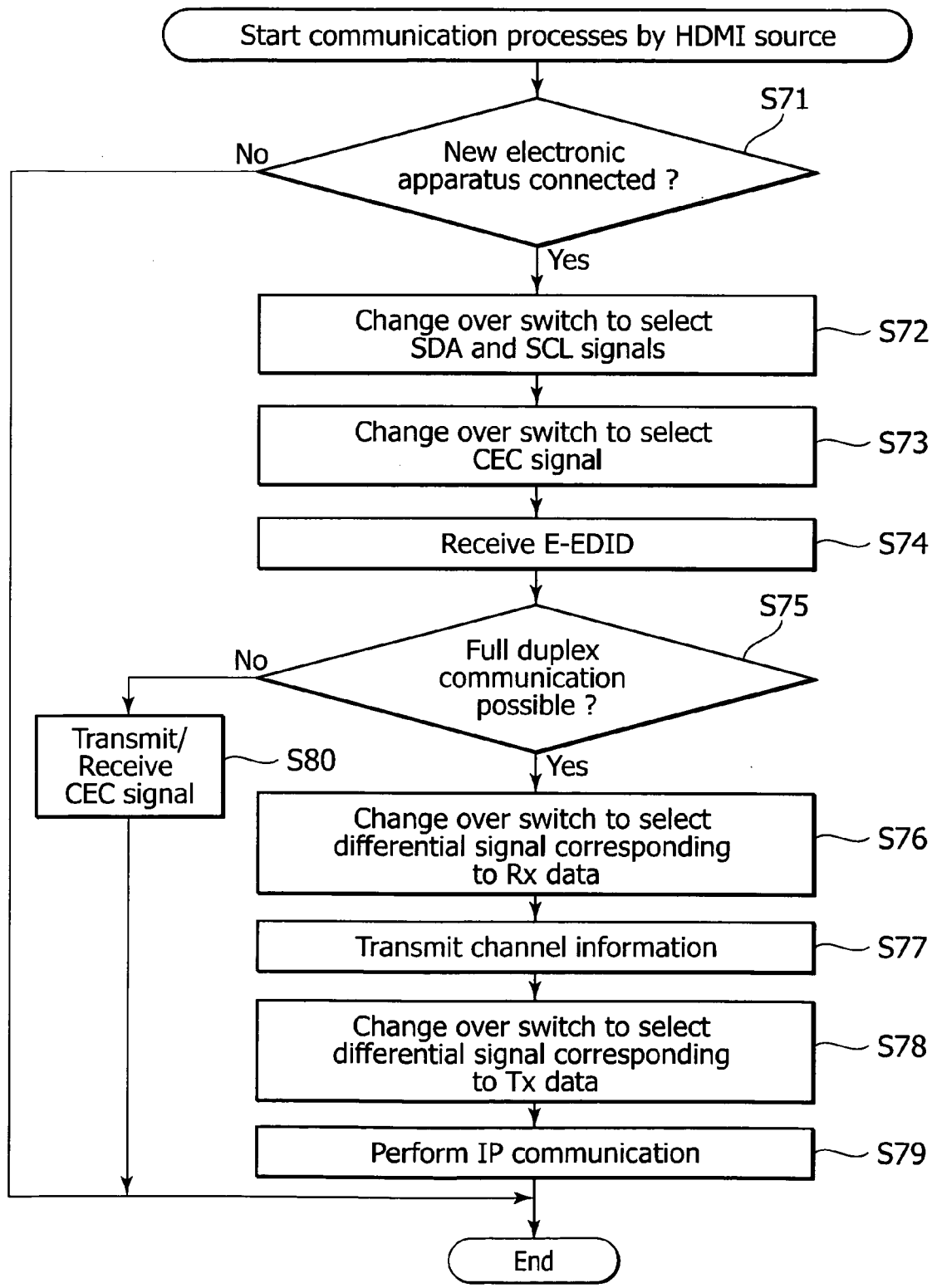
[FIG. 12] A flowchart illustrating a communication process by the HDMI® source.
Figure 13:
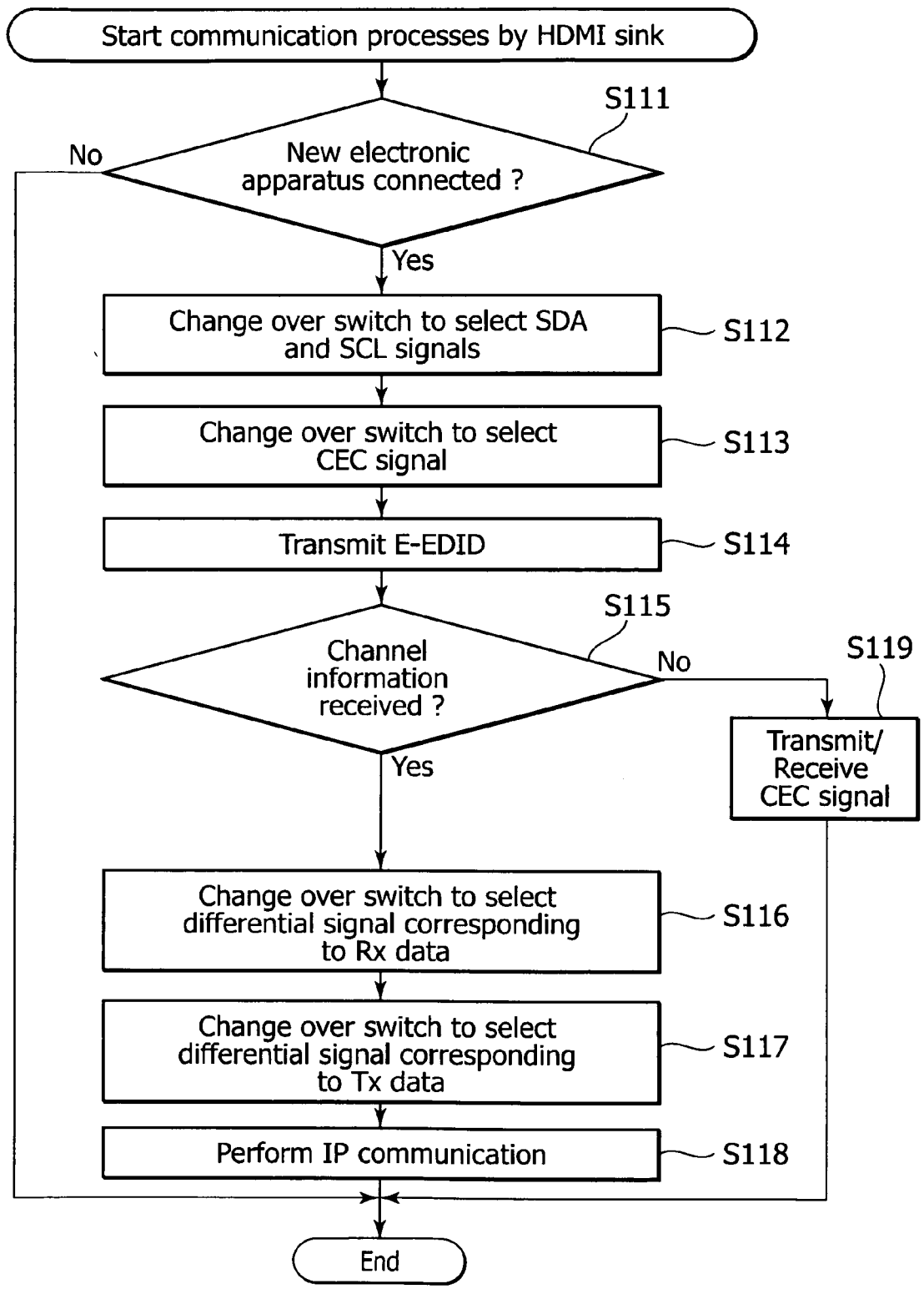
[FIG. 13] A flowchart illustrating a communication process by the HDMI® sink.
Figure 15:
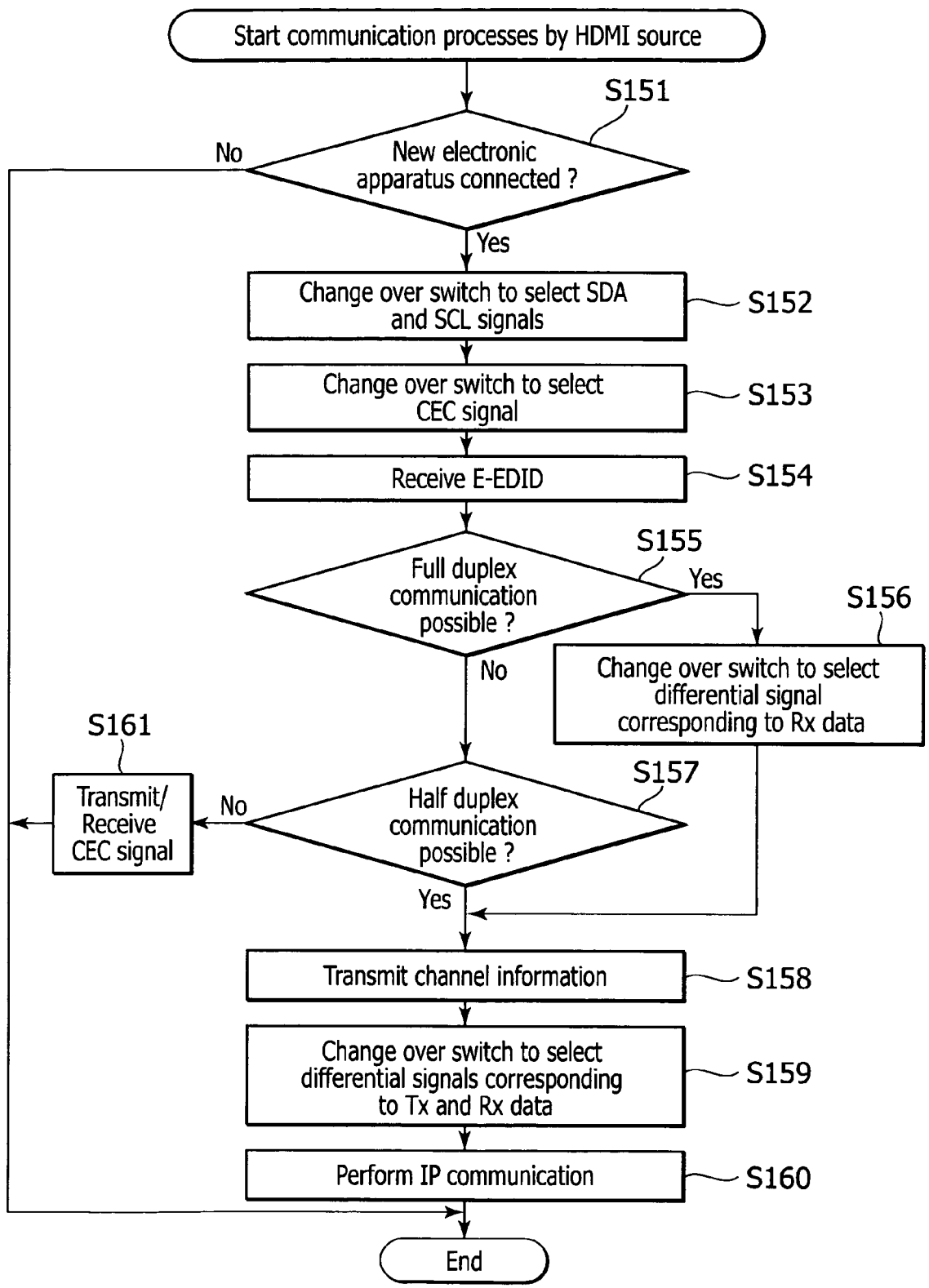
[FIG. 15] A flowchart illustrating a communication process by the HDMI® source.
Figure 16:
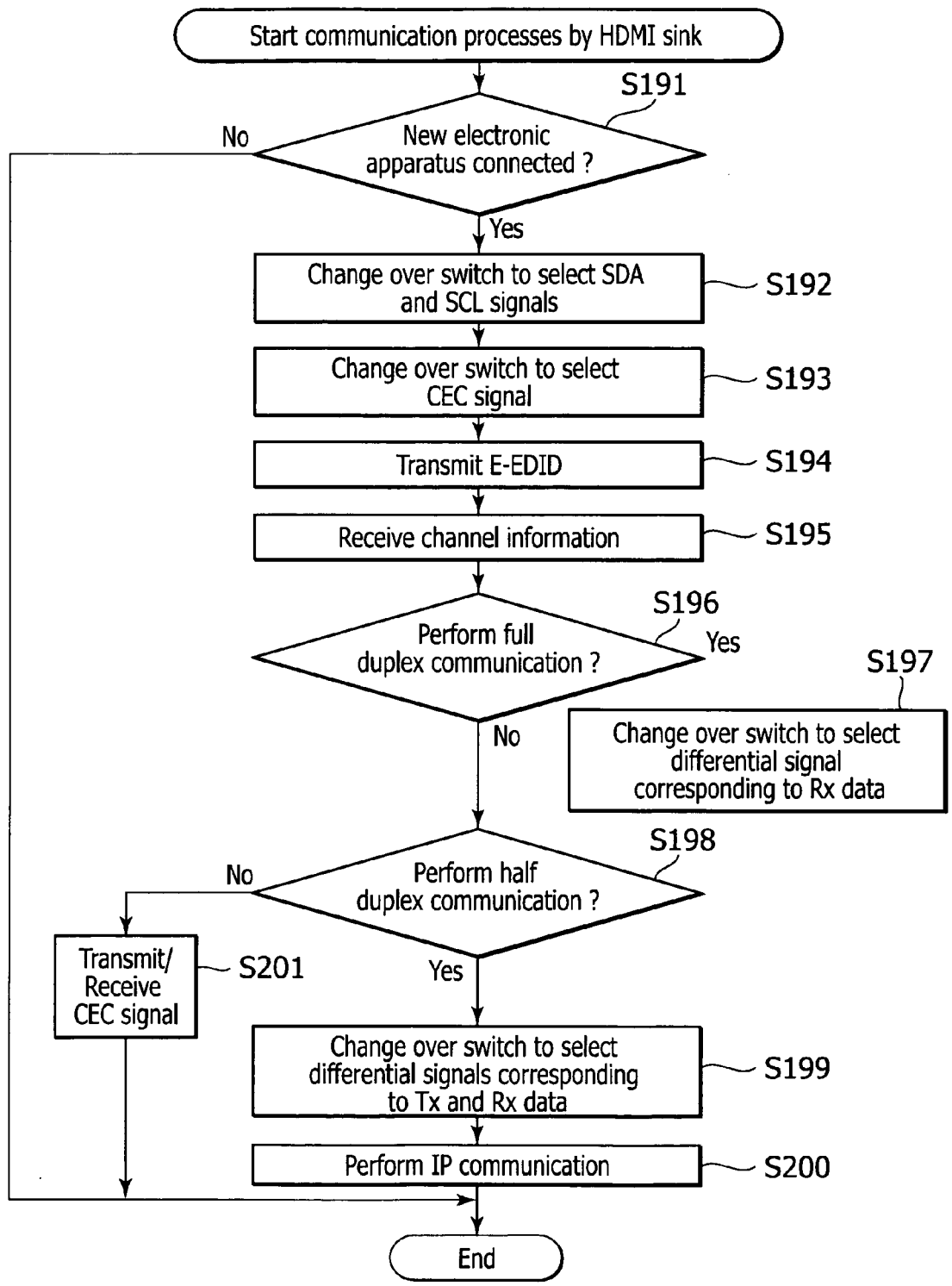
[FIG. 16] A flowchart illustrating a communication process by the HDMI® sink.
Figure 17:
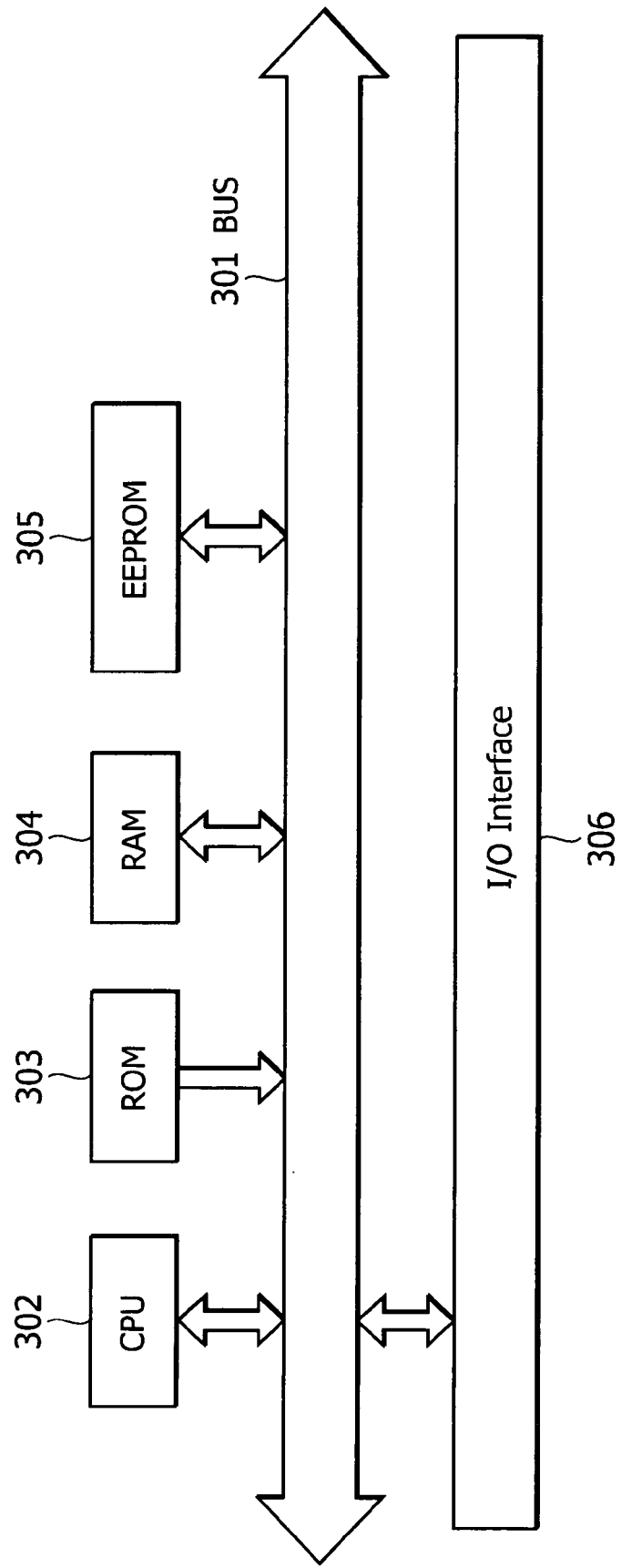
[FIG. 17] A block diagram showing an example of a structure of an embodiment of a computer to which the present invention is applied.
Figure 18:
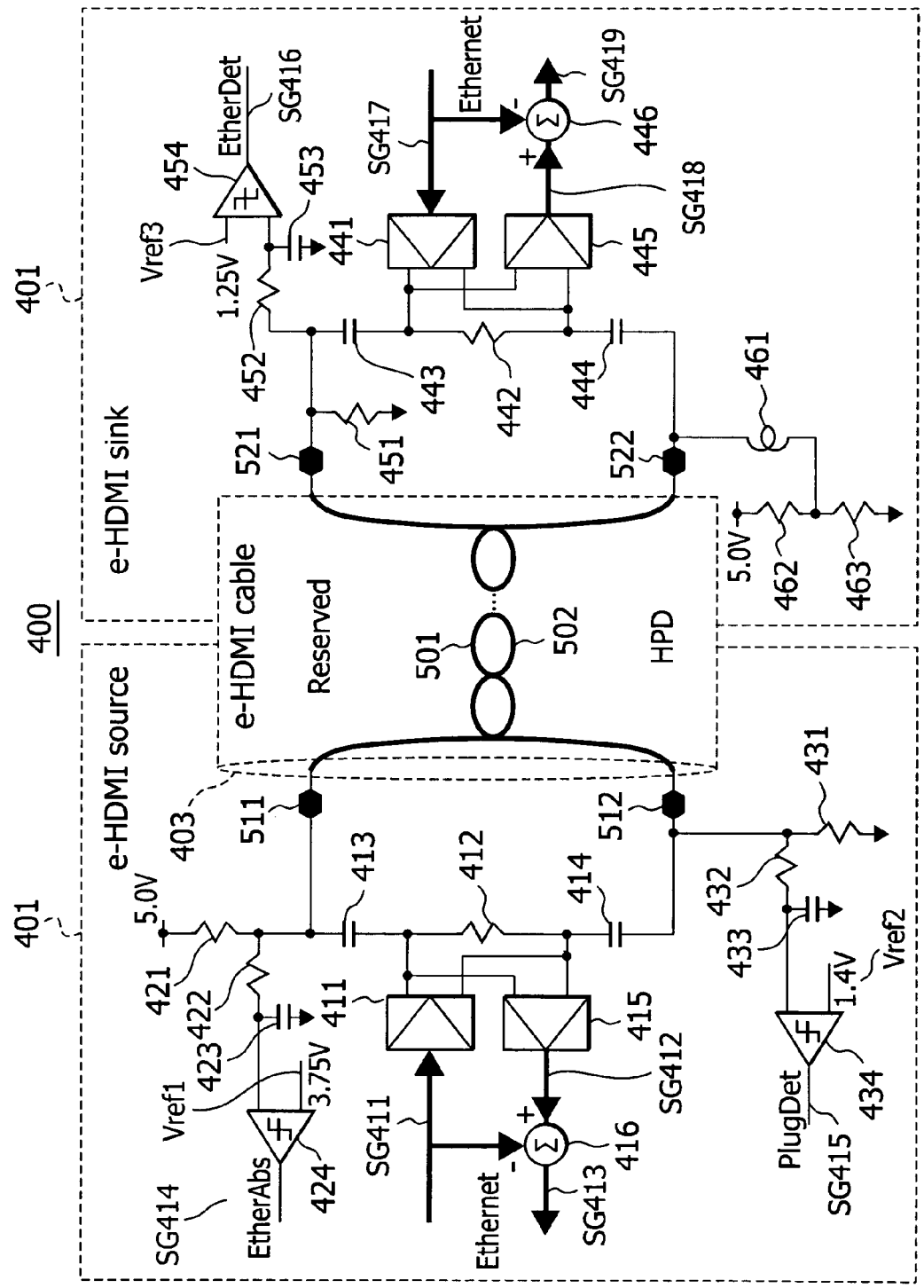
[FIG. 18] A circuit diagram showing an example of a first structure of the communication system in which a connection state of an interface is notified by at least one DC bias potential of transmission lines.
Figure 19:
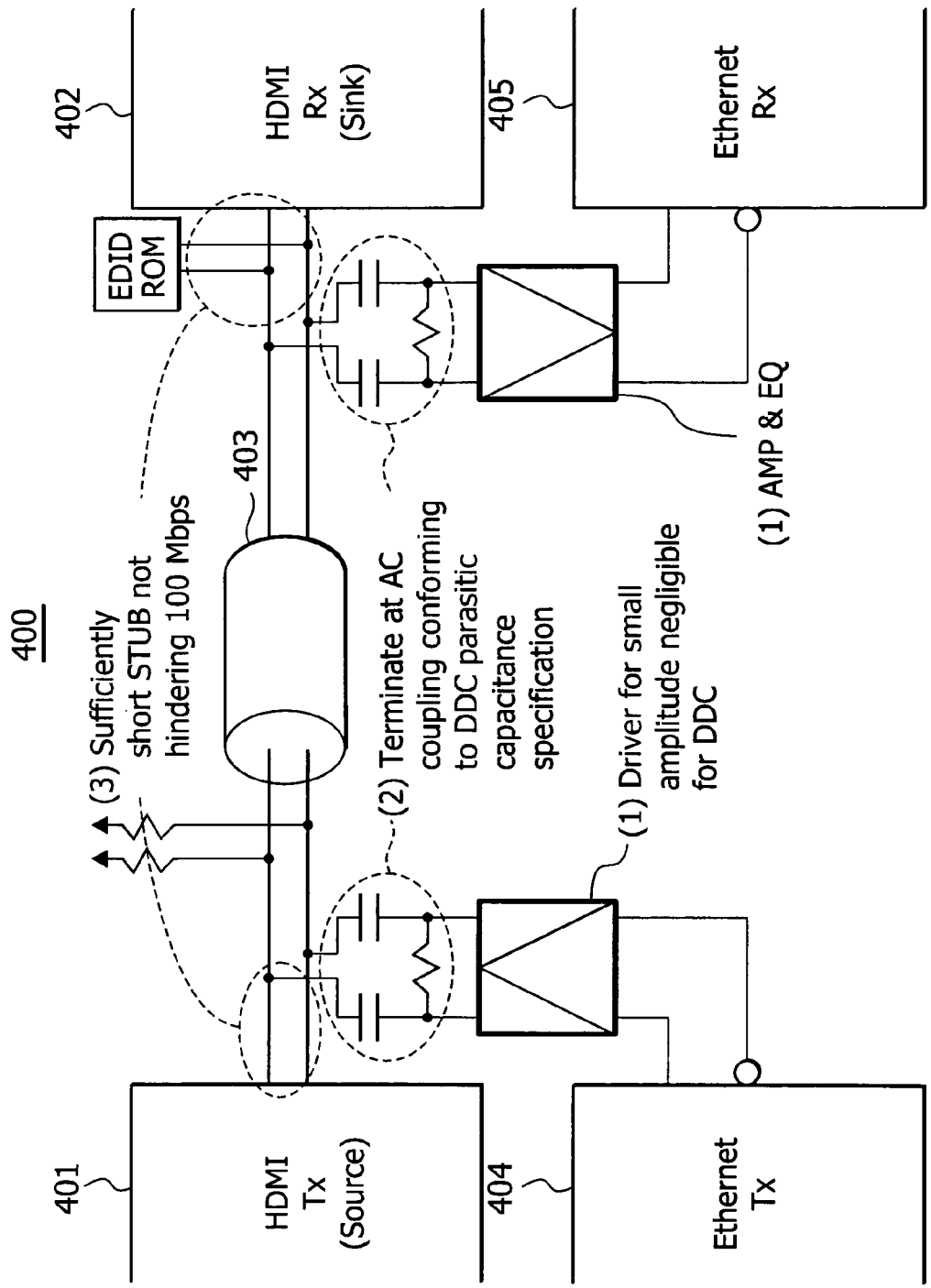
[FIG. 19] A diagram showing an example of the system when used in Ethernet (Registered trademark).
Figure 20:
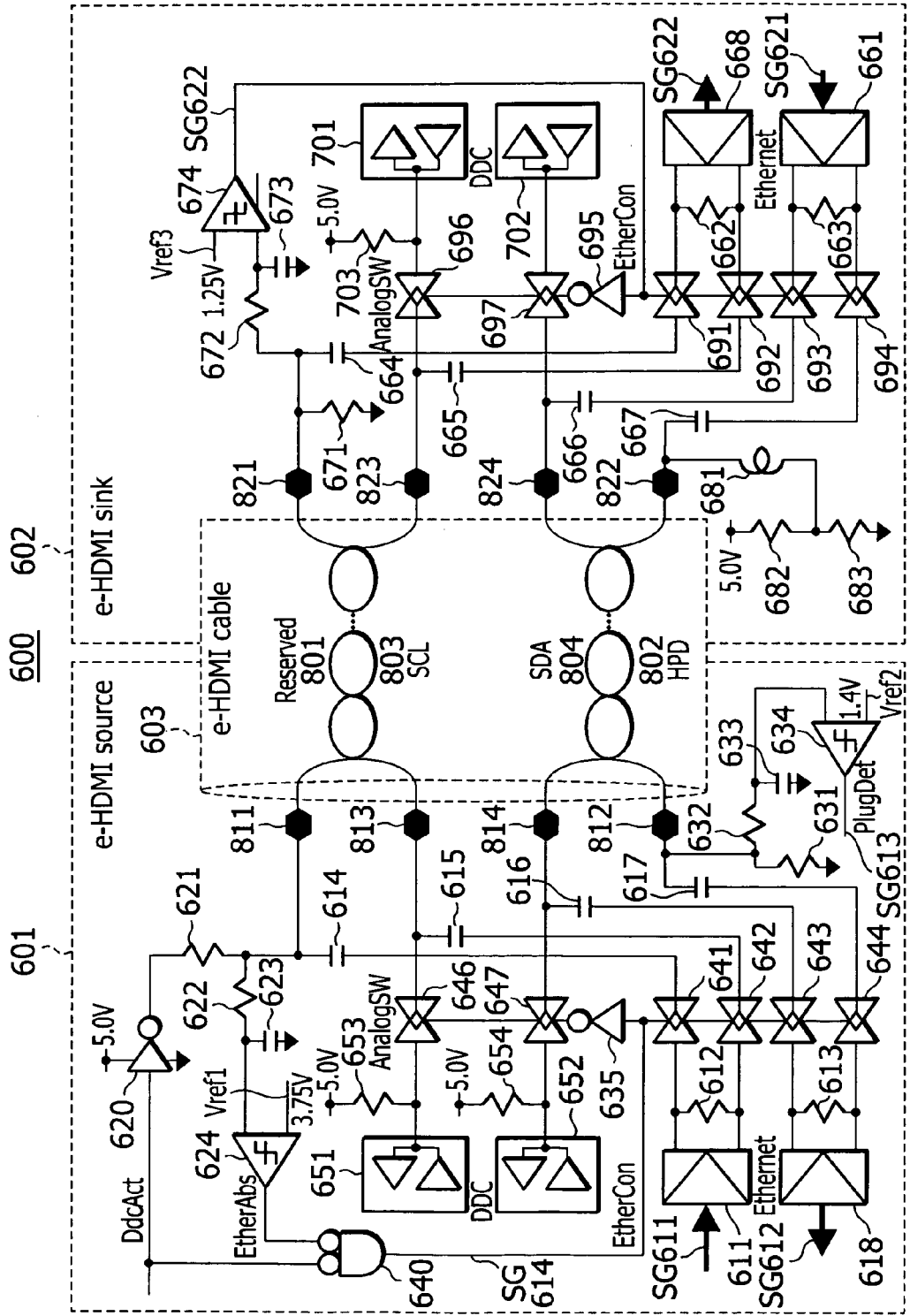
[FIG. 20] A circuit diagram showing an example of a second structure of the communication system in which a connection state of the interface is notified by at least one DC bias potential of the transmission lines.
Figure 21:
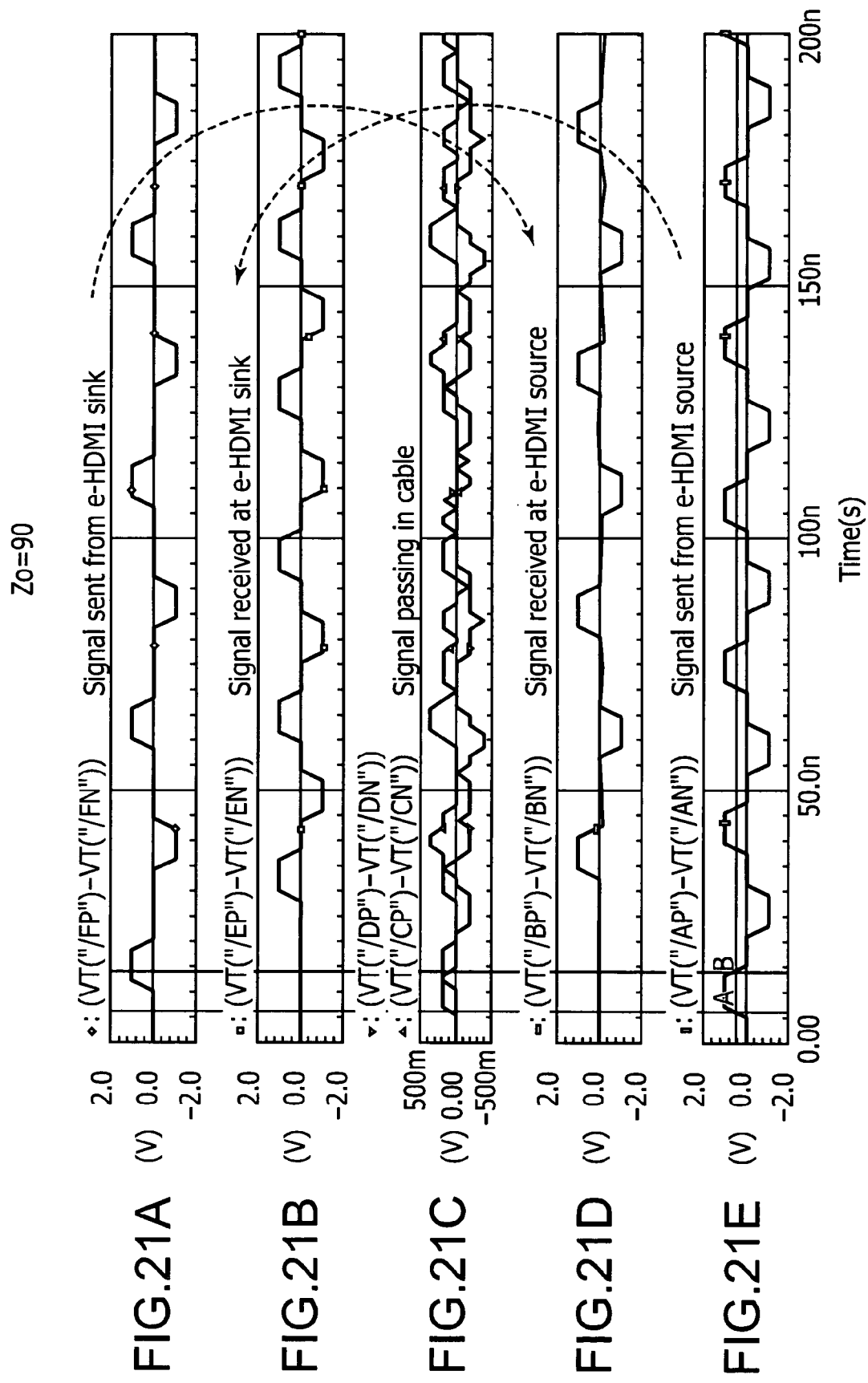
[FIG. 21] Diagrams showing bidirectional communication waveforms on the communication system of the examples of the first and second structures.
Figure 22:
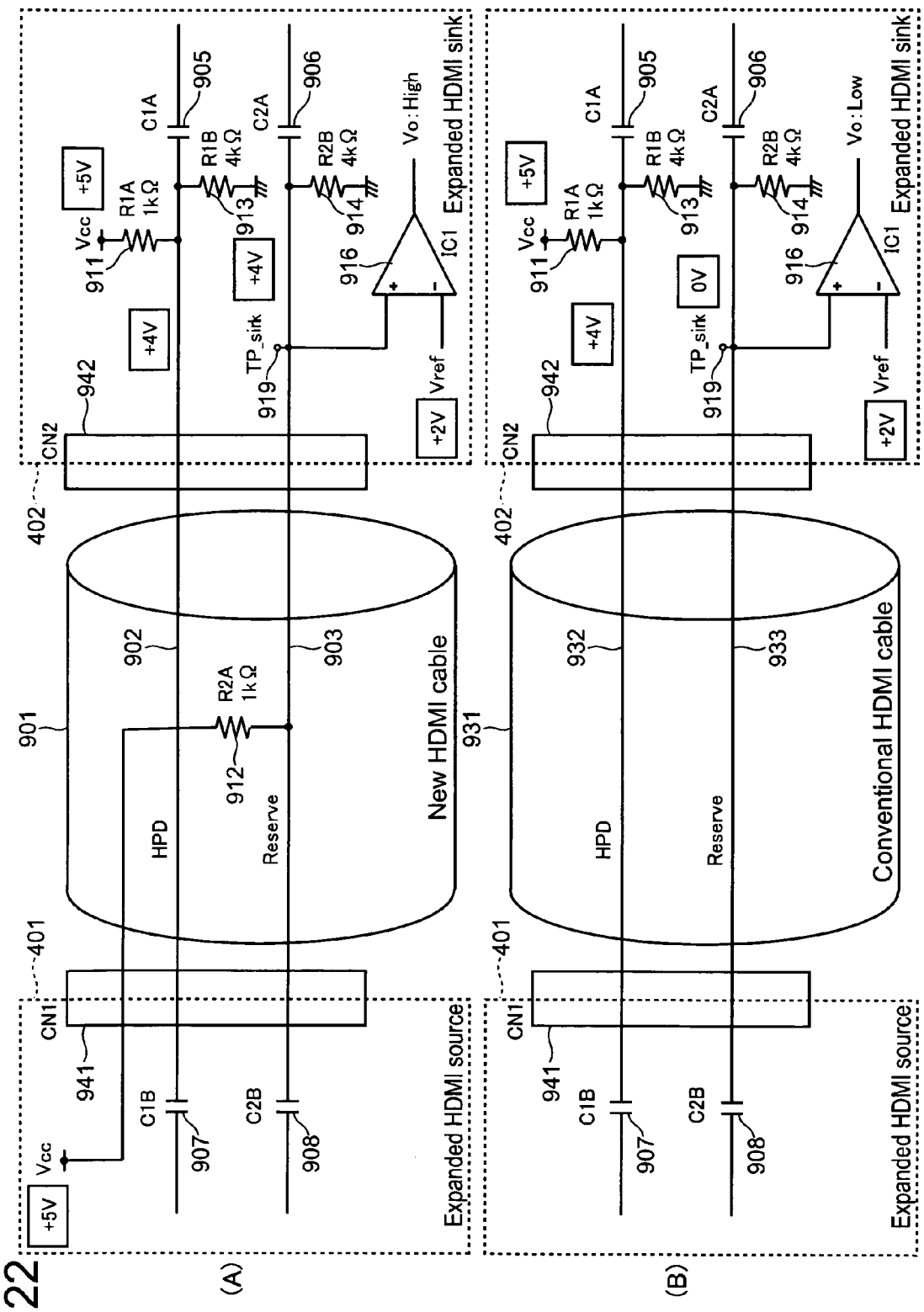
[FIG. 22] Diagrams showing circuit configurations of a sink apparatus and source apparatus in a first embodiment of the present invention.
Figure 23:
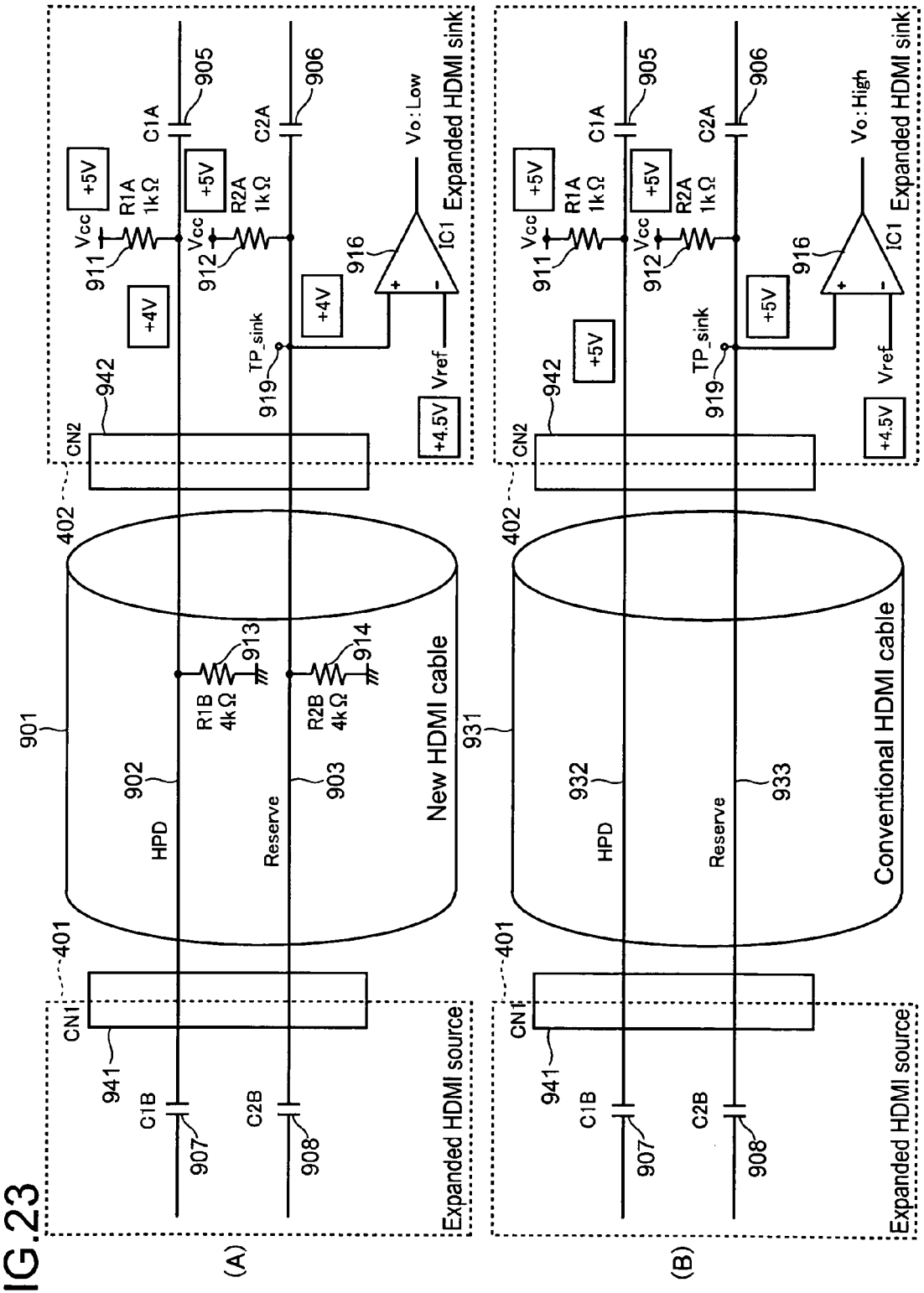
[FIG. 23] Diagrams showing circuit configurations of a sink apparatus and source apparatus in a second embodiment of the present invention.
Figure 24:
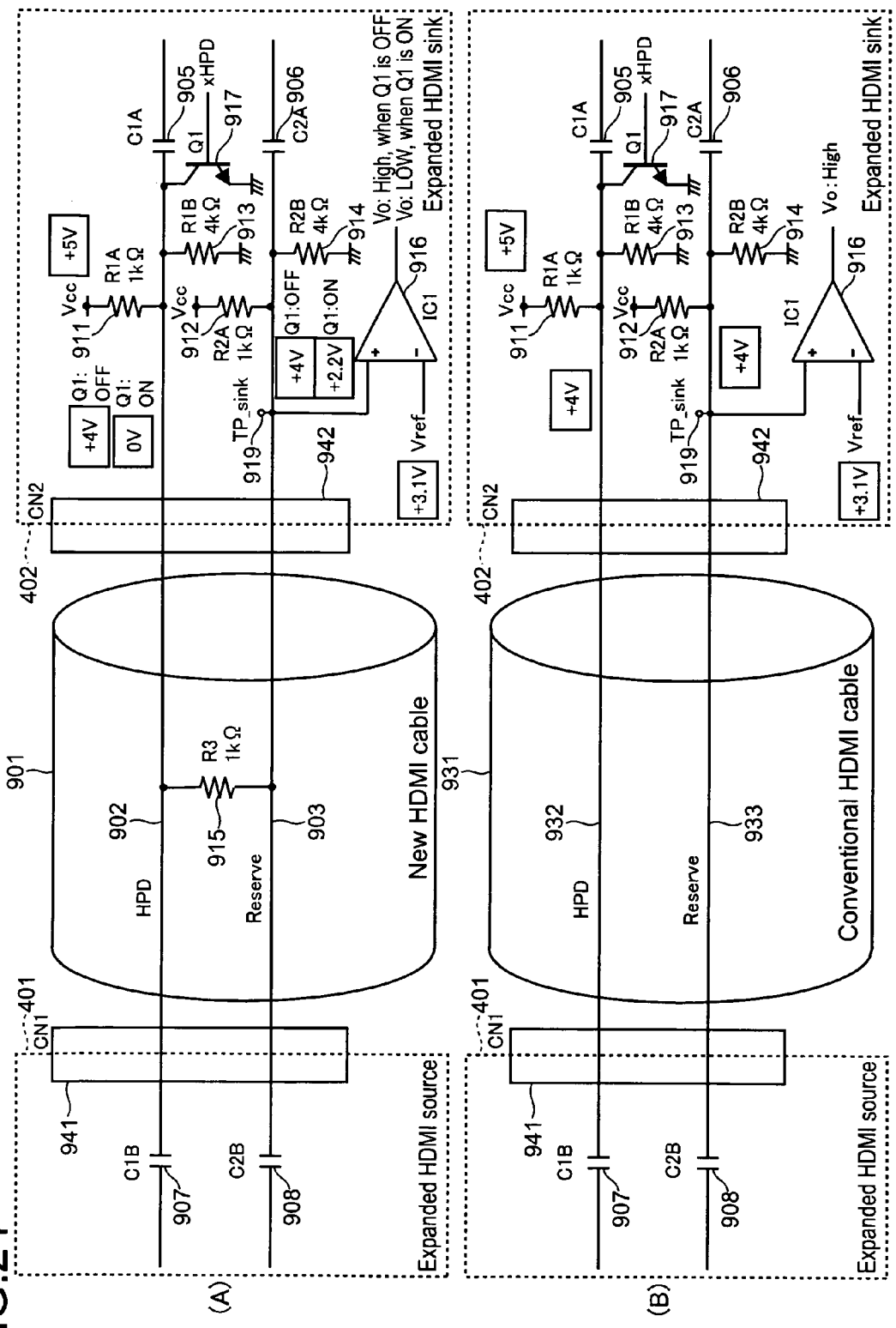
[FIG. 24] Diagrams showing circuit configurations of a sink apparatus and source apparatus in a third embodiment of the present invention.

1 TV, 2 AV amplifier, 3 game apparatus, PC, 5 server, 6 Internet, 35 HDMI® cable, 71 HDMI® source, 72 HDMI® sink, 81 transmitter, 82 receiver, 83 DDC, 84 CEC line, 85 EDIDROM, 121 switching control unit, 124 switching control unit, 131 converting unit, 132 decoding unit, 133 switch, 134 converting unit, 135 switch, 136 decoding unit, 141 signal line, 171 switching control unit, 172 switching control unit, 181 switch, 182 switch, 183 decoding unit, 184 converting unit, 185 switch, 186 switch, 191 SDA line, 192 SCL line, 400 communication system, 401 LAN function expansion HDMI (EH) source apparatus, 411 LAN signal transmitter circuit, 412 terminating resistor, 413, 414 AC coupling capacitor, 415 LAN signal receiver circuit, 416 subtracting circuit, 421 pull-up resistor, 422 a resistor, 423 capacitor, 424 comparator, 431 pull-down resistor, 432 resistor, 433 capacitor, 434 comparator, 402 EH sink apparatus, 441 LAN signal transmitter circuit, 442 terminating resistor, 443, 444 AC coupling capacitor, 445 LAN signal receiver circuit, 446 subtracting circuit, 451 a pull-down resistor, 452 resistor, 453 capacitor, 454 comparator, 461 choke coil, 462, 463 resistors, 403 EH cable, 501 reserved line, 502 HPD line, 511, 512 source side terminal, 521, 522 sink side terminal, 600 communication system, 601 LAN function expansion HDMI (EH) source apparatus, 611 LAN signal transmitter circuit, 612, 613 terminating resistor, 614-617 AC coupling capacitor, 618 LAN signal receiver circuit, 620 inverter, 621 resistor, 622 resistor, 623 capacitor, 624 comparator, 631 pull-down resistor, 632 resistor, 633 capacitor, 634 comparator, 640 NOR gate, 641-644 analog switch, 645 inverter, 646, 647 analog switch, 651, 652 DDC transceivers, 653, 654 pull-up resistor, 602 EH sink apparatus, 661 LAN signal transmitter circuit, 662, 663 terminating resistor, 664-667 AC coupling capacitor, 668 LAN signal receiver circuit, 671 pull-down resistor, 672 resistor, 673 capacitor, 674 comparator, 681 choke coil, 682, 683 resistor, 695 inverter, 696, 697 analog switch, 701, 702 DDC transceiver, 703 pull-up resistor, 603 EH cable, 801 reserved line, 802 HPD line, 803 SCL line, 804 SDA line, 811-814 source side terminal, 821-824 sink side terminal, 901 new HDMI cable, 931 conventional HDMI cable, 902 HPD line 903 reserved line, 905 to 908 capacitor, 911, 912 pull-up resistor, 913, 914 pull-down resistor, 915 resistor, 916 voltage comparator, 917 transistor, 941, 942 connector

The invention claimed is:

1. An electronic apparatus, characterized by comprising:
   a connector capable of connecting with a first cable that incorporates a differential signal line constituted of a first signal line and a second signal line, and a resistor provided on at least the second signal line, and with a second cable that incorporates the first signal line and the second signal line as separate signal lines, respectively;
   a comparison circuit to compare a voltage at the second signal line detected via the connector with a predetermined reference voltage; and
   a discrimination circuit to discriminate whether the first cable or the second cable is connected to the connector based on a result of the comparison.

2. The electronic apparatus according to claim 1, characterized by further comprising:
   a capacitor provided on each of the first signal line and the second signal line.

3. The electronic apparatus according to claim 1, characterized in that
   the resistor is a first pull-up resistor provided on the second signal line, and
   the comparison circuit includes
      a second pull-up resistor and a first pull-down resistor that are provided on the first signal line,
      a second pull-down resistor provided on the second signal line, and
      a comparator to compare the voltage at the second signal line with the reference voltage.

4. The electronic apparatus according to claim 1, characterized in that
   the resistor is constituted of a first pull-down resistor provided on the first signal line and a second pull-down resistor provided on the second signal line, and
   the comparison circuit includes
      a first pull-up resistor provided on the first signal line,
      a second pull-up resistor provided on the second signal line, and
      a comparator to compare the voltage at the second signal line with the reference voltage.

5. The electronic apparatus according to claim 1, characterized in that
   the resistor is provided between the first signal line and the second signal line, and
   the comparison circuit includes
      a first pull-up resistor and a first pull-down resistor that are provided on the first signal line,
      a second pull-up resistor and a second pull-down resistor that are provided on the second signal line,
      an open-collector type transistor provided on the first signal line, and
      a comparator to compare the voltage at the second signal line with the reference voltage.

6. The electronic apparatus according to claim 1, characterized by further comprising:
   an output device to output a result of the discrimination.

* * * * *